US012640152B2

(12) United States Patent
Kim et al.

(10) Patent No.: US 12,640,152 B2
(45) Date of Patent: May 26, 2026

(54) ELECTRONIC DEVICE FOR CONTROLLING EXECUTION OF VOICE COMMAND AND METHOD THEREOF

(71) Applicant: SAMSUNG ELECTRONICS CO., LTD., Suwon-si (KR)

(72) Inventors: Sunghan Kim, Suwon-si (KR); Sol Kim, Suwon-si (KR); Youngbin Kim, Suwon-si (KR); Jisu Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 82 days.

(21) Appl. No.: 18/535,568

(22) Filed: Dec. 11, 2023

(65) Prior Publication Data

US 2024/0127815 A1 Apr. 18, 2024

Related U.S. Application Data

(63) Continuation of application No. PCT/KR2023/015158, filed on Sep. 27, 2023.

(30) Foreign Application Priority Data

Oct. 8, 2022 (KR) ........................ 10-2022-0129140
Nov. 2, 2022 (KR) ........................ 10-2022-0144807

(51) Int. Cl.
*G10L 15/22* (2006.01)
*G10L 25/78* (2013.01)
(52) U.S. Cl.
CPC .............. *G10L 15/22* (2013.01); *G10L 25/78* (2013.01); *G10L 2015/221* (2013.01); *G10L 2015/223* (2013.01)

(58) Field of Classification Search
CPC ..................... G10L 15/22; G10L 25/78; G10L 2015/221; G10L 2015/223; G10L 15/32
See application file for complete search history.

(56) References Cited

U.S. PATENT DOCUMENTS 6,330,539 B1* 12/2001 Takayama ........... G10L 15/1822
704/251
7,458,098 B2 11/2008 Judge et al.
(Continued)

FOREIGN PATENT DOCUMENTS

JP 2005-249829 A 9/2005
JP 5283947 B2 9/2013
(Continued)

OTHER PUBLICATIONS

International Search Report dated Jan. 22, 2024, issued by the International Searching Authority in International Application No. PCT/KR2023/015158.
(Continued)

*Primary Examiner* — Abul K Azad
(74) *Attorney, Agent, or Firm* — Sughrue Mion, PLLC

(57) ABSTRACT

An electronic device includes a communication circuitry, a microphone, a speaker, a memory, and a processor. The processor may identify a first audio signal received through the microphone. The processor may perform, based on identifying that the first audio signal may include a speech for sequentially executing a plurality of functions, at least one first function from among the plurality of functions. The processor may perform, based on identifying that the first audio signal may include the speech, at least one second function from among the plurality of functions on an external electronic device through the communication circuitry, the at least one second function being different from the at least one first function. The processor may sequentially output, through the speaker, at least one second audio signal
(Continued)

representing at least one result of performing the at least one first function and the at least one second function based on a sequence associated with the speech.

19 Claims, 16 Drawing Sheets

(56)                    References Cited

U.S. PATENT DOCUMENTS

| | | | |
|---|---|---|---|
| 7,933,777 | B2 | 4/2011 | Koll |
| 8,249,877 | B2 | 8/2012 | Koll |
| 9,305,554 | B2 | 4/2016 | Jagatheesan et al. |
| 9,390,716 | B2* | 7/2016 | Nakano .................. G10L 15/08 |
| 10,229,681 | B2 | 3/2019 | Lee et al. |
| 10,282,419 | B2 | 5/2019 | Hebert et al. |
| 2014/0188463 | A1* | 7/2014 | Noh ........................ G10L 15/00 704/201 |
| 2014/0244258 | A1* | 8/2014 | Song ....................... G10L 15/18 704/249 |
| 2015/0379993 | A1* | 12/2015 | Subhojit .............. G10L 15/065 704/275 |
| 2017/0019362 | A1* | 1/2017 | Kim ........................ H04L 51/10 |
| 2018/0096675 | A1 | 4/2018 | Nygaard et al. |
| 2019/0012198 | A1 | 1/2019 | Ni et al. |
| 2019/0066677 | A1 | 2/2019 | Jaygarl et al. |
| 2020/0075008 | A1 | 3/2020 | Kim et al. |
| 2020/0126538 | A1 | 4/2020 | Han et al. |
| 2020/0302923 | A1 | 9/2020 | Ni |
| 2021/0005191 | A1* | 1/2021 | Chun ..................... G10L 15/30 |
| 2022/0406308 | A1 | 12/2022 | Yoo |
| 2023/0169102 | A1 | 6/2023 | Lange et al. |

FOREIGN PATENT DOCUMENTS

| | | |
|---|---|---|
| KR | 10-1021215 B1 | 3/2011 |
| KR | 10-2017-0087207 A | 7/2017 |
| KR | 10-1786533 B1 | 10/2017 |
| KR | 10-2018-0116726 A | 10/2018 |
| KR | 10-2019-0035454 A | 4/2019 |
| KR | 10-2026479 B1 | 9/2019 |
| KR | 10-2014774 B1 | 10/2019 |
| KR | 10-2369083 B1 | 3/2022 |
| KR | 10-2022-0082577 A | 6/2022 |
| WO | 2019/216873 A1 | 11/2019 |

OTHER PUBLICATIONS

Written Opinion dated Jan. 22, 2024, issued by the International Searching Authority in International Application No. PCT/KR2023/015158.
Communication dated Nov. 17, 2025, issued by the European Patent Office in European Application No. 23875178.8.

* cited by examiner

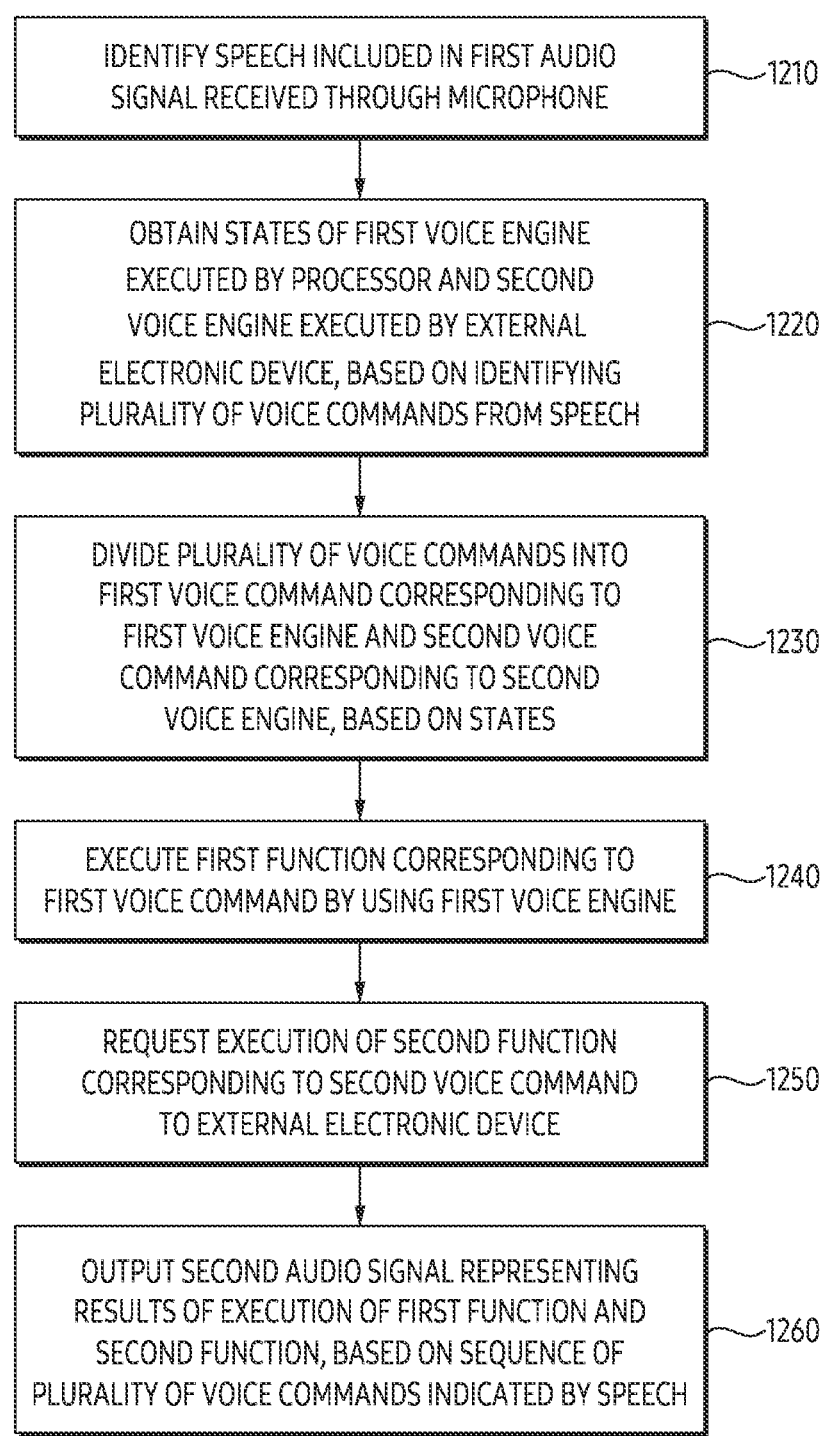

IDENTIFY SPEECH INCLUDED IN FIRST AUDIO
SIGNAL RECEIVED THROUGH MICROPHONE ~1210

OBTAIN STATES OF FIRST VOICE ENGINE
EXECUTED BY PROCESSOR AND SECOND
VOICE ENGINE EXECUTED BY EXTERNAL
ELECTRONIC DEVICE, BASED ON IDENTIFYING
PLURALITY OF VOICE COMMANDS FROM SPEECH ~1220

DIVIDE PLURALITY OF VOICE COMMANDS INTO
FIRST VOICE COMMAND CORRESPONDING TO
FIRST VOICE ENGINE AND SECOND VOICE
COMMAND CORRESPONDING TO SECOND
VOICE ENGINE, BASED ON STATES ~1230

EXECUTE FIRST FUNCTION CORRESPONDING TO
FIRST VOICE COMMAND BY USING FIRST VOICE ENGINE ~1240

REQUEST EXECUTION OF SECOND FUNCTION
CORRESPONDING TO SECOND VOICE COMMAND
TO EXTERNAL ELECTRONIC DEVICE ~1250

OUTPUT SECOND AUDIO SIGNAL REPRESENTING
RESULTS OF EXECUTION OF FIRST FUNCTION AND
SECOND FUNCTION, BASED ON SEQUENCE OF
PLURALITY OF VOICE COMMANDS INDICATED BY SPEECH ~1260

FIG. 12

ELECTRONIC DEVICE FOR CONTROLLING EXECUTION OF VOICE COMMAND AND METHOD THEREOF

CROSS-REFERENCE TO RELATED APPLICATIONS

This application is a continuation of PCT International Application No. PCT/KR2023/015158, filed on Sep. 27, 2023, which claims priority to Korean Patent Application No. 10-2022-0129140, filed on Oct. 8, 2022, in the Korean Intellectual Property Office, and Korean Patent Application No. 10-2022-0144807, filed on Nov. 2, 2022, in the Korean Intellectual Property Office, the disclosures of which are incorporated by reference herein their entireties.

BACKGROUND

1. Technical Field

The disclosure relates to an electronic device for controlling execution of a voice command and a method thereof.

2. Description of Related Art

An interface between an electronic device and a user may include a keyboard and/or a mouse. The types of interfaces between the electronic device and the user may be expanded to more intuitively control the electronic device. For example, the electronic device may use a microphone to identify a user's speech for controlling the electronic device.

SUMMARY

According to an embodiment, an electronic device may include a communication circuitry, a microphone, a speaker, a memory storing at least one instruction, and at least one processor. The at least one processor may be configured to execute the at least one instruction to identify a first audio signal received through the microphone. The at least one processor may be configured to, based on identifying that the first audio signal may include a speech for sequentially executing a plurality of functions, perform at least one first function from among the plurality of functions. The at least one processor may be configured to, based on identifying that the first audio signal may include the speech, perform at least one second function from among the plurality of functions on an external electronic device through the communication circuitry. The at least one second function may be different from the at least one first function. The at least one processor may be configured to sequentially output, through the speaker, at least one second audio signal representing at least one result of performing the at least one first function and the at least one second function based on a sequence associated with the speech.

According to an embodiment, a method of an electronic device, may include identifying, based on receiving a first audio signal through a microphone of the electronic device, a speech in the first audio signal. The method may include obtaining, based on identifying a plurality of voice commands from the speech, a state of a first voice engine that is executed on the electronic device, and a state of a second voice engine that is executed on an external electronic device, the external electronic device being connected through communication circuitry of the electronic device. The method may include obtaining, based on the state of the first voice engine and the state of the second voice engine, information for dividing the plurality of voice commands into at least one first voice command to be performed by the first voice engine, and at least one second voice command to be performed by the second voice engine. The method may include performing a first function corresponding to the at least one first voice command using the first voice engine, and requesting the external electronic device to perform a second function corresponding to the at least one second voice command. The method may include outputting, through a speaker of the electronic device, at least one second audio signal representing at least one result of performing the first function and the second function based on a sequence of the plurality of voice commands indicated by the speech.

According to an embodiment, a method of an electronic device may include identifying a first audio signal received through a microphone of the electronic device. The method may include, based on identifying that the first audio signal may include a speech for sequentially executing a plurality of functions, performing at least one first function from the plurality of functions. The method may include, based on identifying that the first audio signal may include the speech, performing at least one second function from the plurality of functions, on an external electronic device connected through communication circuitry of the electronic device, the at least one second function being different from the at least one first function. The method may include sequentially outputting, through a speaker of the electronic device, at least one second audio signal representing at least one result of performing the at least one first function and the at least one second function based on a sequence associated with the speech.

According to an embodiment, an electronic device may comprise a communication circuitry, a microphone, a speaker, and a processor. The processor may be configured to identify a first audio signal through the microphone. The processor may be configured to execute, based on identifying a speech for sequentially executing a plurality of functions from the first audio signal, at least one first function among the plurality of functions. The processor may be configured to execute, based on identifying the speech, by using an external electronic device connected through the communication circuitry, at least one second function different from the at least one first function among the plurality of functions. The processor may be configured to sequentially output, through the speaker, second audio signals representing results of executing the at least one first function and the at least one second function according to a sequence associated with the speech.

According to an embodiment, a method of an electronic device may include identifying a first audio signal through a microphone of the electronic device. The method may include executing, based on identifying a speech for sequentially executing a plurality of functions from the first audio signal, at least one first function among the plurality of functions. The method may comprise executing, based on identifying the speech, by using an external electronic device connected through a communication circuitry of the electronic device, at least one second function different from the at least one first function among the plurality of functions. The method may include sequentially outputting, through a speaker of the electronic device, second audio signals representing results of executing the at least one first function and the at least one second function according to a sequence associated with the speech.

According to an embodiment, an electronic device may include a communication circuitry, a microphone, a speaker, and a processor. The processor may be configured to identify, based on receiving an audio signal through the microphone, a speech included in the first audio signal. The processor may be configured to obtain, based on identifying a plurality of voice commands from the speech, states of a first voice engine which is executed by the processor for processing a voice command, and a second voice engine executed by an external electronic device connected through the communication circuitry. The processor may be configured to obtain, based on the states, information for dividing the plurality of voice commands into first voice command corresponding to the first voice engine, and second voice corresponding to the second voice engine. The processor may be configured to executing first function corresponding to the first voice command by using the first voice engine, and requesting execution of second function corresponding to the second voice command to the external electronic device, based on the information. The processor may be configured to output, through the speaker, a second audio signal representing results of execution of the first function and the second function based on a sequence of the plurality of voice commands indicated by the speech.

According to an embodiment, a method of an electronic device may include identifying, based on receiving a first audio signal through a microphone of the electronic device, a speech included in the first audio signal. The method may comprise obtaining, based on identifying a plurality of voice commands from the speech, states of a first voice engine which is executed by the processor for processing a voice command, and a second voice engine executed by an external electronic device connected through a communication circuitry of the electronic device. The method may comprise obtaining, based on the states, information for dividing the plurality of voice commands into first voice command corresponding to the first voice engine, and second voice corresponding to the second voice engine. The method may comprise, based on the information, executing first function corresponding to the first voice command by using the first voice engine, and requesting execution of second function corresponding to the second voice command to the external electronic device. The method may comprise outputting, through a speaker of the electronic device, a second audio signal representing results of execution of the first function and the second function based on a sequence of the plurality of voice commands indicated by the speech.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12 is a flowchart of an operation performed by an electronic device, according to an embodiment;

DETAILED DESCRIPTION

Figure 1:
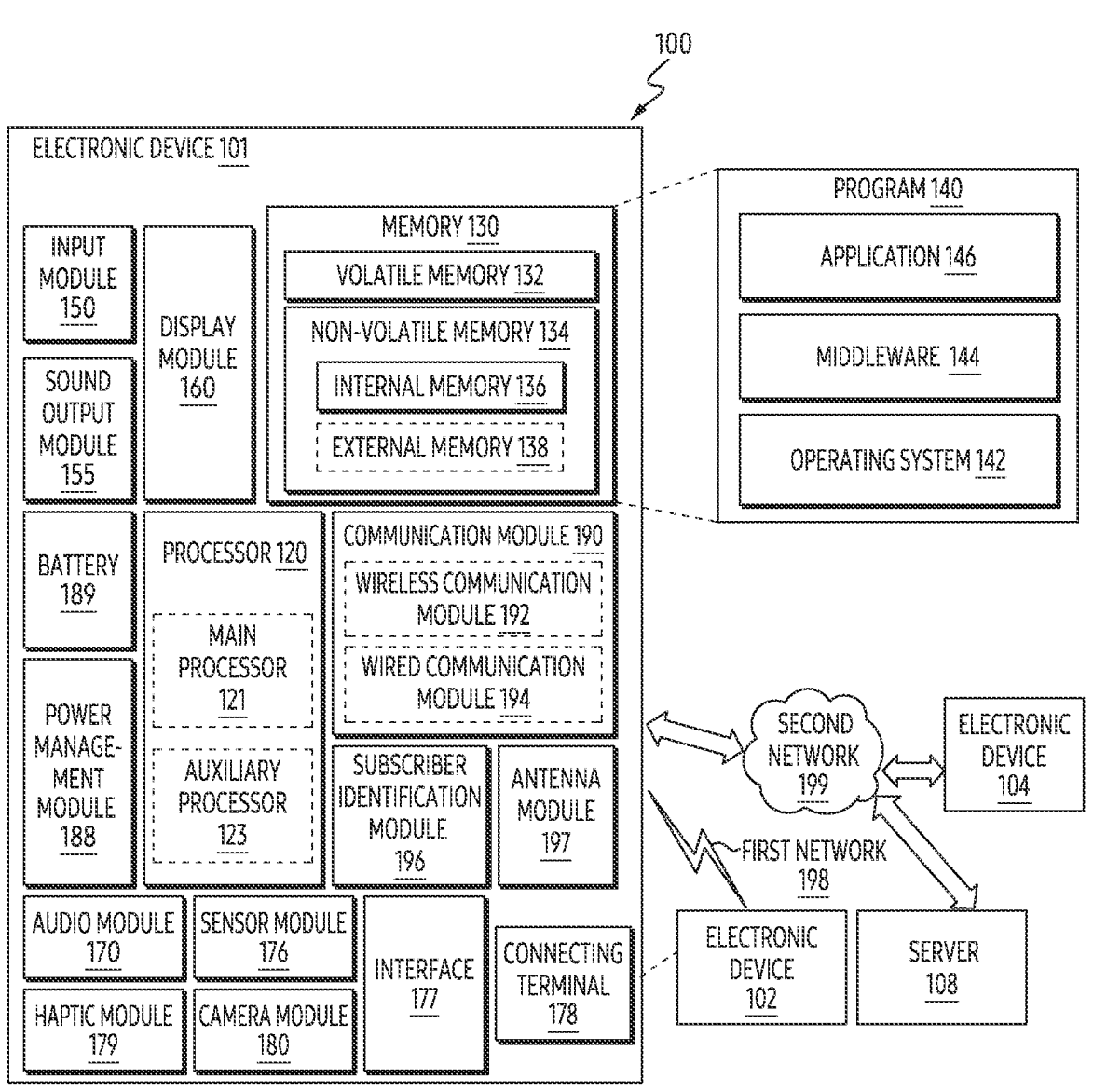
FIG. 1 is a block diagram of an electronic device in a network environment, according to an embodiment.

Hereinafter, example embodiments of the present disclosure will be described with reference to the accompanying drawings.

It should be appreciated that the embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with the embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram of an electronic device 101 in a network environment 100, according to an embodiment.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
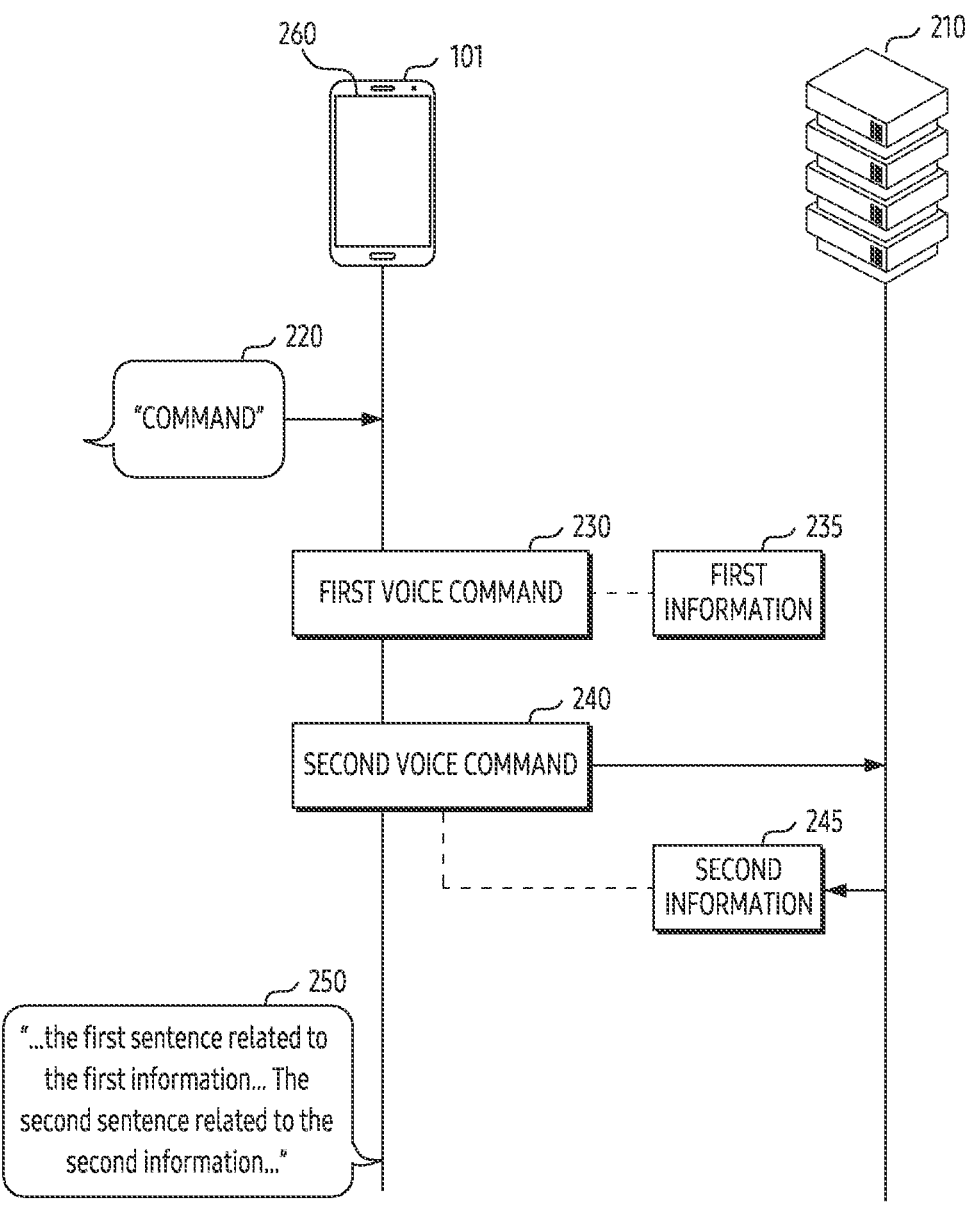
FIG. 2 illustrates an operation in which an electronic device executes one or more functions based on a speech, according to an embodiment.

FIG. 2 illustrates an operation in which an electronic device 101 executes one or more functions based on a speech 220, according to an embodiment.

The electronic device 101 of FIG. 2 may include the electronic device 101 of FIG. 1. The electronic device 101 may be a terminal owned by a user. The terminal may include, for example, a personal computer (PC) such as a laptop and a desktop, a smartphone, a smart pad, and a tablet PC. The terminal may include smart accessories such as a smartwatch and/or a head-mounted device (HMD).

According to an embodiment, the electronic device 101 may interact with a user by using sound. The electronic device 101 may obtain an audio signal, which is an electrical signal dependent on a sound of an external space including the electronic device 101, by using a microphone (e.g., the input module 150 of FIG. 1). The electronic device 101 may identify the user's speech 220 from the audio signal. In response to identifying the speech 220, the electronic device 101 may execute one or more functions related to the speech 220. The electronic device 101 may output information including a result of execution of one or more the functions to the user. Referring to FIG. 2, the electronic device 101 may generate an audio signal including a speech 250. The electronic device 101 may play a sound dependent on the audio signal, by controlling a speaker (e.g., the sound output module 155 of FIG. 1) based on the audio signal. An example structure of the electronic device 101 including a microphone and/or a speaker will be described with reference to FIG. 3.

According to an embodiment, the electronic device 101 may identify an input indicating to execute at least one function related to the electronic device 101, from the speech 220. Hereinafter, a voice command may include a command (e.g., a command of natural language) inputted to the electronic device 101 based on sound such as the speech 220. The voice command may be a unit of a function and/or a task executed by the electronic device 101 and/or an external electronic device 210 connected to the electronic device 101, by a sound identified by the electronic device 101. Executing the voice command may include an operation in which the electronic device 101 executes at least one function corresponding to the voice command. The electronic device 101 may identify one or more voice commands included in the speech 220, based on natural language included in the speech 220. The external electronic device 210 connected to the electronic device 101 may include a server (e.g., the server 108 of FIG. 1) connected to the electronic device 101 for processing an audio signal including the speech 220.

Referring to FIG. 2, an example case in which the electronic device 101 identifies a plurality of voice commands (e.g., the first voice command 230 and/or the second voice command 240) from the audio signal identified through the microphone is illustrated. The electronic device 101 may identify the speech 220 for sequentially executing the plurality of functions from the audio signal. The speech 220 may include a preset natural language (e.g., words such as "hey, Bixby") for triggering the recognition of the speech 220 by the electronic device 101. The electronic device 101 identifying the preset natural language may identify one or more voice commands included in the speech 220, by recognizing the speech 220. For example, the speech 220 recognized by the electronic device 101 may include natural language (e.g., words, phrases, and/or sentences) that represents each of the plurality of functions. For example, the speech 220 recognized by the electronic device 101 may include a name assigned to a group of the plurality of functions. The name assigned to the group may be referred to as a quick command and/or an abbreviation. Based on identifying the name from the speech 220, the electronic device 101 may perform the plurality of functions included in the group distinguished by the name. A group of voice commands for executing the plurality of functions may be registered to the electronic device 101, based on an interaction between the electronic device 101 and the user. An example of a user interface (UI) displayed by the electronic device 101 to identify an input for registering the group will be described with reference to FIG. 8A.

According to an embodiment, the electronic device 101 may execute functions corresponding to the first voice command 230 and the second voice command 240, based on identifying the speech 220 for sequential execution of the first voice command 230 and the second voice command 240. The functions may be executed based on an application executed by the electronic device 101 and/or the external electronic device 210. The application executed by the electronic device 101 and/or the external electronic device 210 to execute voice commands may be referred to as a voice engine and/or natural language unit (NLU). An electronic device (e.g., the electronic device 101, and/or the external electronic device 210) in which the voice engine is executed may be controlled to perform an operation matched to the voice command. The duration and/or speed at which the operation matched to the voice command is performed by the execution of the voice engine may depend on the performance of the electronic device in which the voice engine is executed and/or a state of resource.

In an embodiment of FIG. 2 in which voice engines are executed in both the electronic device 101 connected through the network and the external electronic device 210, functions corresponding to the first voice command 230 and the second voice command 240 may be executed by at least one of the voice engines. The electronic device 101 identifying the speech 220 for sequentially executing the first voice command 230 and the second voice command 240 may match each of a first function corresponding to the first voice command 230 and a second function corresponding to the second voice command 240 with the first voice engine executed by the electronic device 101 and the second voice engine executed by the external electronic device 210. For example, the electronic device 101 may control or schedule execution of the first function and the second function, by matching the first voice engine and the second voice engine with the first voice command 230 and the second voice command 240. For example, all of the first function and the second function may be intensively executed by either the first voice engine or the second voice engine. For example, each of the first function and the second function may be distributed and executed by the first voice engine and the second voice engine. An example of an application executed by the electronic device 101 to match a plurality of voice engines with a plurality of voice commands included in the speech 220 will be described with reference to FIGS. 3 to 7.

Referring to FIG. 2, according to an embodiment, an example state in which the electronic device 101 executes functions of each of the first voice command 230 and the second voice command 240 by using different voice engines is illustrated. The electronic device 101 may select a voice engine to be used for executing at least one voice command included in the speech 220, based on states of voice engines executed by different electronic devices including the electronic device 101. For example, at least one of a state of the first voice engine executed by the electronic device 101 or a state of the second voice engine executed by the external electronic device 210 may be monitored. The state of the voice engine may be related to whether a function corresponding to the voice command may be executed based on execution of the voice engine, a time required to execute the function, and/or a latency time before executing the function. Based on the monitored state, the electronic device 101 may select a voice engine to be used for the execution of each of the first voice command 230 and the second voice command 240 included in the speech 220 from the first voice engine and the second voice engine. In the example case of FIG. 2, the electronic device 101 may match the first voice engine with the first voice command 230 and the second voice engine with the second voice command 240.

Based on matching the first voice command 230 with the first voice engine, the electronic device 101 may execute the first function corresponding to the first voice command 230. The electronic device 101 may obtain first information 235 including a result of execution of the first function, based on the execution of the first voice engine. Based on matching the second voice command 240 with the second voice engine, the electronic device 101 may request the external electronic device 210 executing the second voice engine to execute the second function corresponding to the second voice command 240. The electronic device 101 may receive second information 245 related to the second function, as a response to the request from the external electronic device 210. The second information 245 may include a result of executing the second function, based on the external electronic device 210 and/or the second voice engine. The second information 245 may include information for controlling the electronic device 101, based on the execution of the second function.

According to an embodiment, the electronic device 101 may generate an audio signal including a speech 250 representing a results of executing the first function matched to the first voice command 230 and the second function matched to the second voice command 240, based on obtaining the first information 235 and/or the second information 245. The electronic device 101 may obtain the speech 250 representing the first information 235 including the result of executing the first function and the second information 245 including the result of executing the second function, based on one or more natural language sentences. The electronic device 101 may generate the audio signal including the speech 250. The electronic device 101 may output a sound dependent on the audio signal through the speaker, by controlling the speaker based on the generated audio signal. The form in which the electronic device 101 outputs the speech 250 is not limited to the audio signal and/or sound of FIG. 2. An embodiment in which the electronic device 101 visualizes a result of executing at least one voice command for the speech 220 by using hardware such as the display 260 will be described with reference to FIG. 8B.

As described above, according to an embodiment, the electronic device 101 may schedule voice engines to execute a plurality of functions, based on identifying the speech 220 for sequentially executing the plurality of functions from an audio signal outputted from the microphone. For example, the electronic device 101 may divide the plurality of functions into at least one first function to be executed by the first voice engine and at least one second function to be executed by the second voice engine, based on a state of at least one of the voice engines. The electronic device 101 may execute at least one first function among the plurality of functions, based on a result of scheduling voice engines, and execute at least one second function different from the at least one first function, among the plurality of functions, by using the external electronic device 210. The first information 235 of FIG. 2 may be an example of the result of executing at least one first function based on the first voice engine executed by the electronic device 101. The second information 245 of FIG. 2 may be an example of the result of executing at least one second function based on the second voice engine executed by the external electronic device 210. The electronic device 101 may output second audio signals representing results of executing the at least one first function and the at least one second function, through a speaker. The sequence in which the electronic device 101 outputs the second audio signals may be matched to the sequence of the plurality of functions related to the speech 220. Since a plurality of functions corresponding to the speech 220 are executed by distributed processing based on voice engines executed by different electronic devices, the electronic device 101 may more quickly obtain the result of executing the plurality of functions.

Hereinafter, referring to FIG. 3, an example structure of the electronic device 101 and the external electronic device 210 for processing a voice command including the first voice command 230 and the second voice command 240 will be described with reference to FIG. 3.

Figure 3:
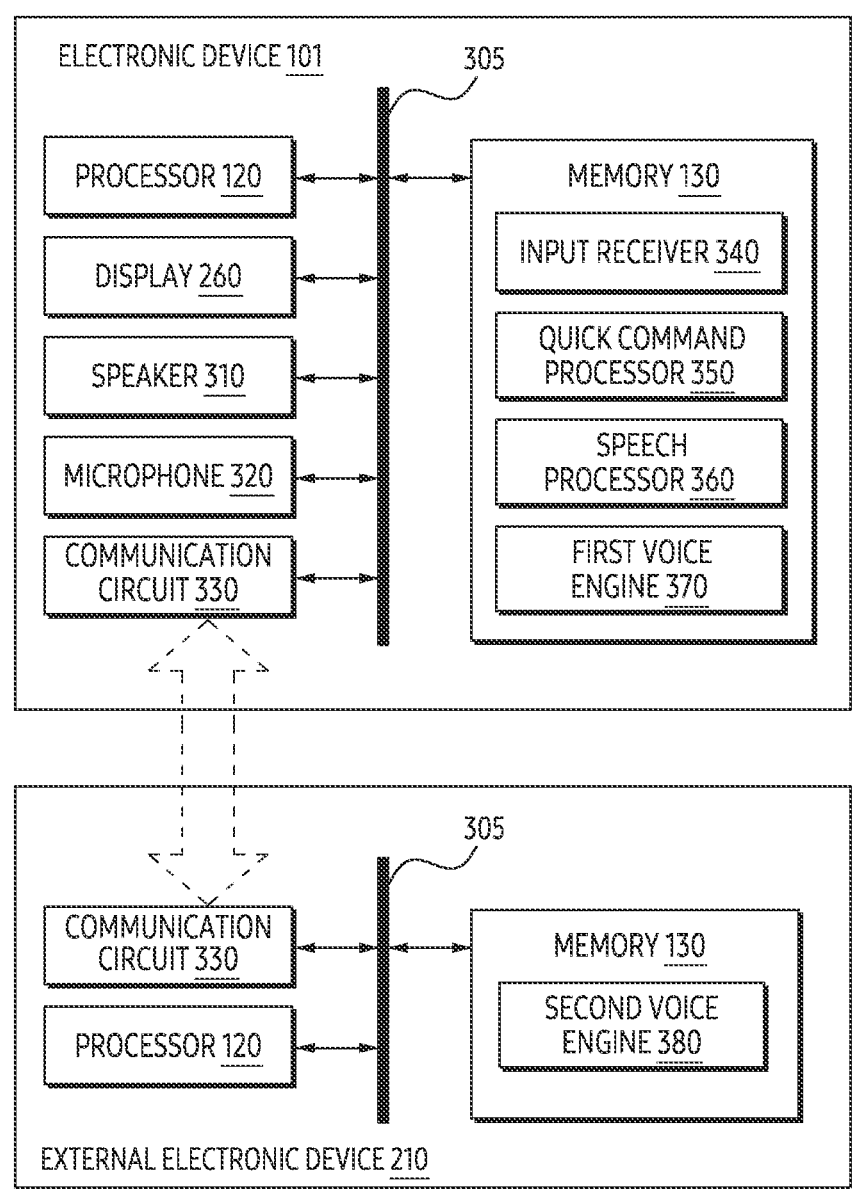
FIG. 3 is a block diagram of an electronic device and an external electronic device, according to an embodiment.

FIG. 3 is a block diagram of an electronic device 101 and an external electronic device 210, according to an embodiment. The electronic device 101 of FIG. 3 may include the electronic device 101 of FIGS. 1 to 2. The external electronic device 210 of FIG. 3 may include the external electronic device 210 of FIG. 2.

The electronic device 101 may include at least one of a processor 120, a memory 130, a display 260, a speaker 310, a microphone 320, or a communication circuit 330. The processor 120, the memory 130, the display 260, the speaker 310, the microphone 320, and the communication circuit 330 may be electrically and/or operably coupled with each other by electronic components such as a communication bus 305. Hereinafter, the operational coupling of hardware components may mean that a direct or indirect connection between hardware components is established by wire or wirelessly, so that a second hardware component is controlled by a first hardware component among the hardware components. Although illustrated based on different blocks, embodiments are not limited thereto, and some of the hardware of FIG. 3 (e.g., at least a part of the processor 120, the memory 130, and the communication circuit 330) may be included in a single integrated circuit, such as a system on a chip (SoC). The types and/or numbers of hardware components included in the electronic device 101 are not limited to those illustrated in FIG. 3. For example, electronic device 101 may include only some of the hardware illustrated in FIG. 3.

According to an embodiment, the processor 120 of the wearable device 101 may include a hardware component for processing data based on one or more instructions. For example, hardware components for processing data may include an arithmetic and logic unit (ALU), a floating point unit (FPU), a field programmable gate array (FPGA), a central processing unit (CPU), and/or application processor (AP). According to an embodiment, the processor 120 may include a plurality of processors. For example, the processor 120 may have a structure of a multi-core processor such as a dual core, a quad core, or a hexa core. The processor 120 of FIG. 3 may include the processor 120 of FIG. 1.

The memory 130 of the electronic device 101 may include a hardware component for storing data and/or instructions inputted and/or outputted to the processor 120. The memory 130 may include, for example, volatile memory such as random-access memory (RAM) and/or non-volatile memory such as read-only memory (ROM). Volatile memory may include, for example, at least one of dynamic RAM (DRAM), static RAM (SRAM), Cache RAM (PSRAM), and pseudo SRAM (PSRAM). Nonvolatile memory may include, for example, at least one of a programmable ROM (PROM), an erasable PROM (EPROM), an electrically erasable PROM (EEPROM), a flash memory, a hard disk, a compact disk, a solid state drive (SSD), and an embedded multimedia card (eMMC). The memory 130 of FIG. 3 may include the memory 130 of FIG. 1.

The display 260 of the electronic device 101 may output visualized information (e.g., at least one of the screens of FIGS. 8A and 8B) to the user. For example, the display 260 may be controlled by a controller such as a graphic processing unit (GPU) and/or a processor 120 to output visualized information to the user. The display 260 may include a flat panel display (FPD) and/or an electronic paper. The FPD may include a liquid crystal display (LCD), a plasma display panel (PDP), and/or one or more light emitting diodes (LEDs). The LED may include an organic LED (OLED). The display 260 of FIG. 3 may include the display module 160 of FIG. 1.

According to an embodiment, the display 260 of the electronic device 101 may include a sensor (e.g., a touch sensor panel (TSP)) for detecting an external object (e.g., a user's finger) on the display 260. For example, based on TSP, the electronic device 101 may detect an external object contacting with the display 260 or floating on the display 260. In response to detecting the external object, the electronic device 101 may execute a function related to a specific visual object corresponding to a position on the display 260 of the external object among visual objects displayed in the display 260.

The electronic device 101 may include a speaker 310 as an output means for outputting information in a form other than a visualized form. The speaker 310 may include a circuit element vibrated by an audio signal (e.g., an audio signal including the speech 250 of FIG. 2) received from the processor 120. The number of speakers 310 included in the electronic device 101 is not limited to an example of FIG. 3, and the electronic device 101 may include one or more speakers. The electronic device 101 may include other output means for outputting information in other forms than visual and auditory forms. For example, the electronic device 101 may include a motor for providing haptic feedback based on vibration.

The microphone 320 of the electronic device 101 may output an electric signal indicating vibration of the atmosphere. For example, the electronic device 101 may identify a user's speech (e.g., the speech 220 of FIG. 2) from an audio signal, which is an electric signal outputted from the microphone 320. The user's speech included in the audio signal may be converted into information in a format recognizable by the electronic device 101, based on speech recognition model and/or natural language understanding model, which are applications and/or processes executed by the processor 120. For example, the electronic device 101 may execute one or more functions among a plurality of functions provided by the electronic device 101, by recognizing the user's speech. The speaker 310 and/or microphone 320 of FIG. 3 may include the sound output module 155 of FIG. 1 and/or the audio module 170.

The communication circuit 330 of the electronic device 101 may include hardware to support transmission and/or reception of an electrical signal between the electronic device 101 and an external electronic device 210. The number of the external electronic device 210 connected to the electronic device 101 through the communication circuit 330 is not limited to an embodiment of FIGS. 2 and/or 3. The communication circuit 330 may include, for example, at least one of a MODEM, an antenna, and an optic/electronic (O/E) converter. The communication circuit 330 may support transmission and/or reception of an electrical signal, based on various types of protocols such as Ethernet, local area network (LAN), wide area network (WAN), wireless fidelity (Wi-Fi), Bluetooth, Bluetooth low energy (BLE), ZigBee, long term evolution (LTE), and 5G new radio (NR). The communication circuit 330 of FIG. 3 may include a communication module 190 of FIG. 1, a subscriber identification module 196, and/or an antenna module 197.

One or more instructions (or commands) indicating calculations and/or operations to be performed by the processor on data may be stored within the memory 130. A set of one or more instructions may be referred to as firmware, operating system (e.g., the operating system 142 of FIG. 1), program (e.g., the program 140 of FIG. 1), process, routine, sub-routine, and/or application (e.g., the application 146 in FIG. 1). For example, the electronic device 101 and/or the processor 120 may perform at least one of operations of FIGS. 10 to 12, when set of a plurality of instructions distributed in the form of an operating system, firmware, driver, and/or application is executed. Hereinafter, the fact that the application is installed in the electronic device 101 indicates that one or more instructions provided in the form of the application are stored in the memory 130 of the electronic device 101, and mean that the one or more applications are stored in a format (e.g., a file with an extension specified by operating system of the electronic device 101) executable by the processor 120 of the electronic device 101.

In an embodiment of FIG. 3, the external electronic device 210 may be connected to the electronic device 101 by wire or wirelessly to perform a function related to voice recognition. The external electronic device 210 may include a server. The server may include one or more PCs and/or workstations. In an embodiment, the server is a service that executes one or more functions corresponding to a speech identified from the audio signal outputted from the microphone 320 of the electronic device 101, and may include, for example, a voice recognition service. The external electronic device 210 may include at least one of the processor 120, the memory 130, and the communication circuit 330. The processor 120, the memory 130, and the communication circuit 330 may be electrically and/or operably coupled through the communication bus 305 in the external electronic device 210. The processor 120, the memory 130, and the communication circuit 330 included in the external electronic device 210 may include a hardware component and/or a circuit corresponding to the processor 120, the memory 130, and the communication circuit 330 of the electronic device 101. Hereinafter, in order to reduce repetition, descriptions of the processor 120, the memory 130, and the communication circuit 330 included in the external electronic device 210 may be omitted within a range of overlapping the processor 120, the memory 130, and the communication circuit 330 in the electronic device 101.

Referring to FIG. 3, an input receiver 340, a quick command processor 350, a speech processor 360, and/or a first voice engine 370 are illustrated as programs executed by the processor 120 of the electronic device 101. For example, a set of a plurality of instructions stored in the memory 130 and/or processes executed by the processor 120 may be divided into the input receiver 340, the quick command processor 350, the speech processor 360, and/or the first voice engine 370. The input receiver 340, the quick command processor 350, the speech processor 360, and/or the first voice engine 370 may be included in one application installed in the electronic device 101. The application may be executed by the processor 120 of the electronic device 101 to control the electronic device 101 based on a speech including a natural language sentence.

Referring to FIG. 3, a second voice engine 380 is illustrated as a program executed by the processor 120 of the external electronic device 210. The second voice engine 380 may include a set (e.g., an application) of a plurality of applications stored in the memory 130. The second voice engine 380 may be executed by the processor 120 of the external electronic device 210 to execute a voice command requested from another electronic device (e.g., the electronic device 101) connected to the external electronic device 210. The electronic device 101 may establish a communication link with the external electronic device 210 by using the communication circuit 330, to execute at least one voice command identified by the electronic device 101 by using the second voice engine 380 executed by the external electronic device 210. For example, the electronic device 101 may establish the communication link, based on identifying preset natural language to guide the utterance of natural language sentences corresponding to at least one voice command, from an audio signal outputted from the microphone 320.

According to an embodiment, the electronic device 101 may identify a speech from an audio signal outputted from the microphone 320 based on the execution of the input receiver 340. In a state that the input receiver 340 is executed, the electronic device 101 may perform an operation to identify a speech included in the audio signal, based on receiving the audio signal through the microphone 320. The audio signal processed by the input receiver 340 may be transmitted to the second voice engine 380 of the external electronic device 210 by the processor 120 of the electronic device 101. The input receiver 340 may identify text corresponding to the user's speech from one or more characters inputted through a software keyboard displayed through the display 260 and/or a hardware keyboard connected to the electronic device 101, as well as an audio signal outputted from the microphone 320.

The electronic device 101 may obtain text representing a speech included in the audio signal from the external electronic device 210 executing the second voice engine 380. Based on the execution of the quick command processor 350, the electronic device 101 may identify whether the text obtained from the external electronic device 210 includes a name assigned to a group of one or more voice commands (e.g., quick command). Based on the execution of the quick command processor 350, the electronic device 101 may obtain the name and a group of one or more voice commands corresponding to the name from the user. Based on the execution of the quick command processor 350, the electronic device 101 may process whether the user's speech includes a name assigned to the group or a user input for registering the group. An example structure of the quick command processor 350 will be described with reference to FIG. 6.

When a speech included in the audio signal obtained through the microphone 320 includes a name assigned to a group of one or more voice commands, the electronic device 101 may control the execution of one or more voice commands included in the group, based on the execution of the speech processor 360. Based on the execution of the speech processor 360, the electronic device 101 may select a voice engine to which the one or more voice commands will be inputted, from among the first voice engine 370 or the second voice engine 380. For example, the electronic device 101 may schedule the execution of one or more functions corresponding to the one or more voice commands, based on the execution of the speech processor 360. The electronic device 101 may obtain a state of one or more voice engines (e.g., the first voice engine 370 and/or the second voice engine 380) executed to process the voice command, based on identifying a plurality of voice commands from the speech. The electronic device 101 may schedule execution of the one or more functions, based on the states. Based on the execution of the speech processor 360, the electronic device 101 may input one or more voice commands in the group to the first voice engine 370, or transmit the one or more voice commands to the external electronic device 210 through the communication circuit 330 of the electronic device 101.

Based on the execution of the speech processor 360, the electronic device 101 may obtain information (e.g., the first information 235 and/or the second information 245 of FIG. 2) including a result of executing one or more functions corresponding to the one or more voice commands, from the first voice engine 370 and/or the second voice engine 380. The electronic device 101 may output the information obtained using the speech processor 360 through the speaker 310 and/or the display 260. For example, the electronic device 101 may transmit an audio signal representing the information to the speaker 310. For example, the electronic device 101 may display a visual object and/or a screen including the information, by controlling the display 260. An example structure of the speech processor 360 executed by the electronic device 101 to obtain results of scheduling voice commands and/or executing a function corresponding to the voice commands described with reference to FIGS. 4 to 7.

The electronic device 101 may identify at least one voice command matched to the first voice engine 370 by the speech processor 360, based on the execution of the first voice engine 370. The electronic device 101 may execute at least one function corresponding to the at least one voice command. The at least one function may include at least one of a function for controlling hardware included in the electronic device 101 (e.g., a function to adjust the volume of the speaker 310), a function supported by an application installed in the memory 130 (e.g., alarm, play music), and a function to retrieve information from network through the communication circuit 330 (e.g., weather search). The electronic device 101 may store a result of executing at least one voice command by using the speech processor 360, or output the result to the user.

The processor 120 of the external electronic device 210 may execute at least one function corresponding to at least one voice command requested from the electronic device 101, based on the execution of the second voice engine 380. The electronic device 101 may request the external electronic device 210 to execute at least one voice command, based on the speech processor 360. In a state in which the second voice engine 380 is executed, the processor 120 of the external electronic device 210 may execute at least one function corresponding to the at least one voice command included in the request. The processor 120 of the external electronic device 210 may transmit a result of executing the at least one function to the electronic device 101, by using the communication circuit 330. The results transmitted to the electronic device 101 may be outputted to the user, by the processor 120 of the electronic device 101 executing the speech processor 360.

As described above, according to an embodiment, the electronic device 101 may schedule or control execution of at least one function to be executed by a plurality of voice engines (e.g., the first voice engine 370 and the second voice engine 380), based on application such as the speech processor 360. Based on the scheduling of a plurality of voice engines, the electronic device 101 may reduce resource of the electronic device 101 and/or the external electronic device 210 occupied for the execution of the plurality of voice engines while efficiently using the plurality of voice engines.

According to an embodiment, the electronic device 101 may identify attributes of the voice commands included in the group, in a state registering a group of the voice commands by interacting with the user. The attribute may be used for scheduling a voice engine to execute functions corresponding to voice commands included in the group. Hereinafter, according to an embodiment, an example of an operation in which the electronic device 101 stores a group of a plurality of voice commands will be described with reference to FIG. 4.

Figure 4:
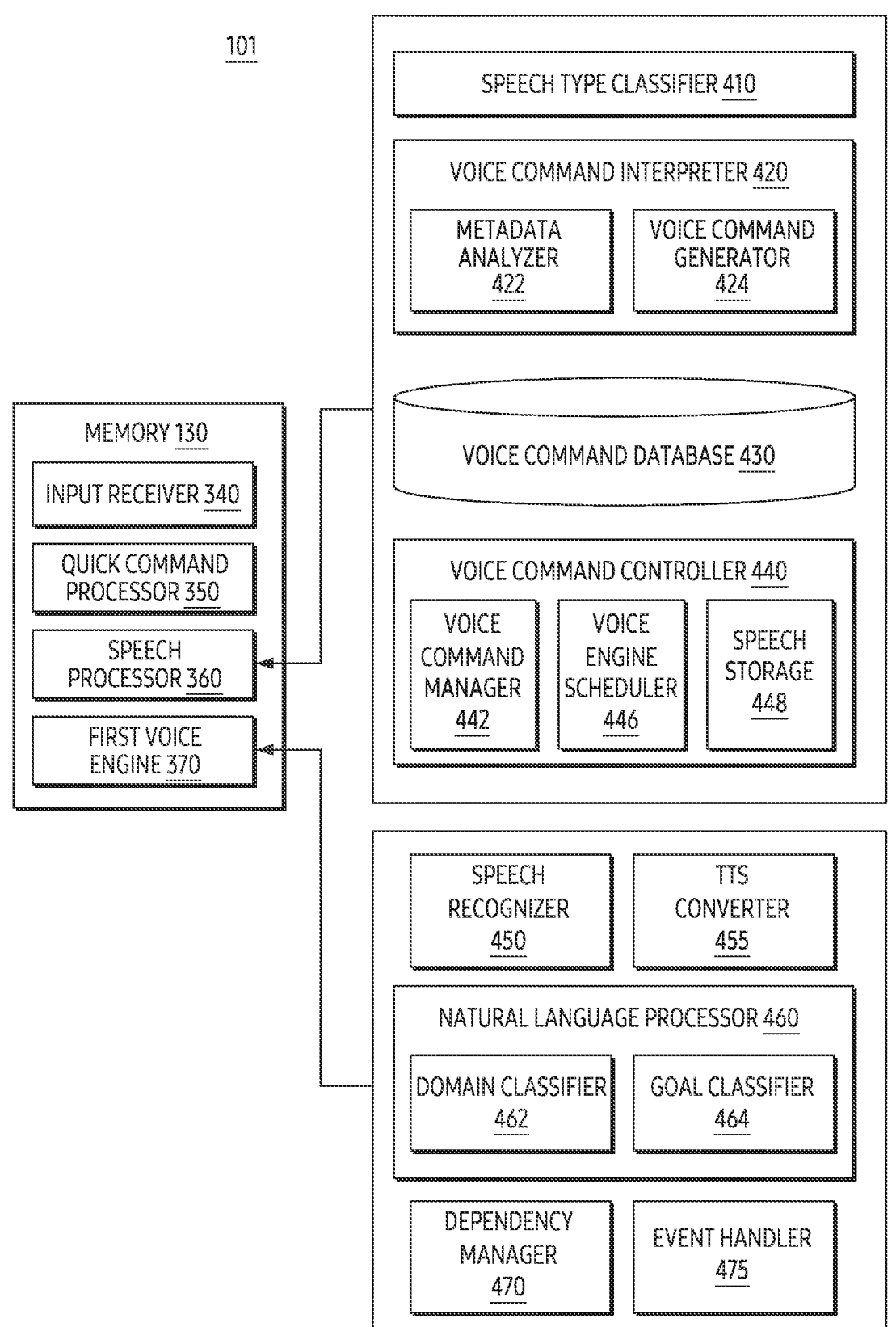
FIG. 4 is a block diagram of a program executed by an electronic device, according to an embodiment.

FIG. 4 is a block diagram of a program executed by an electronic device 101, according to an embodiment.

The electronic device 101 of FIG. 4 may be an example of the electronic device 101 of FIG. 3. For example, the input receiver 340, the quick command processor 350, the speech processor 360, and the first voice engine 370 executed by the electronic device 101, the memory 130, and the processor 120 of FIG. 3 may include the electronic device 101, the memory 130, the input receiver 340, the quick command processor 350, the speech processor 360, and the first voice engine 370 of FIG. 4.

Referring to FIG. 4, instructions and/or sub-routines of the first voice engine 370 to execute a function related to the user's speech (e.g., a speech included in an audio signal) may be divided into a speech recognizer 450, a text-to-speech converter 455, a natural language processor 460, a dependency manager 470, and/or an event handler 475. Instructions and/or sub-routines of the natural language processor 460 may be divided into a domain classifier 462 and/or a goal classifier 464.

Referring to FIG. 4, instructions and/or sub-routines of the speech processor 360 to identify one or more voice commands from the user's speech (e.g., a speech included in audio signal) may be divided into a speech type classifier 410, a voice command interpreter 420, and/or a voice command controller 440. Based on the execution of the speech processor 360, the electronic device 101 may manage a voice command database 430 in the memory 130. An example of information stored in the voice command database 430 will be described with reference to FIG. 5. Instructions and/or sub-routines in the voice command interpreter 420 may be divided into a metadata analyzer 422 and/or a voice command generator 424. Instructions and/or sub-routines in the voice command controller 440 may be divided into a voice command manager 442, a voice engine scheduler 446, and a speech storage 448.

Based on the execution of the speech processor 360, the electronic device 101 may control execution of one or more voice commands matched to the user's intention included in the speech. In a state that identifies an input for registering a group of a plurality of voice commands from the user, the electronic device 101 may obtain attributes for each of the plurality of voice commands included in the group, based on the execution of the speech type classifier 410. The electronic device 101 may generate metadata of a voice command based on the attributes. The metadata may be stored in the memory 130 of the electronic device 101. Table 1 may include an example of attributes included in the metadata of the voice command.

TABLE 1

| Name of attribute | Description |
|---|---|
| Prompt | Whether a parameter different from a quick command is required to execute a function corresponding to a voice command |
| Time | Time dependency of a function corresponding to a voice command |
| Location | Location dependency of a function corresponding to a voice command |
| Device context | Terminal state dependency of a function corresponding to a voice command |
| onDevice supported | Whether a function corresponding to a voice command may be executed by a voice engine executed by a terminal |
| Event list | List of at least one function to be executed in response to a voice command |

The name of Table 1 may be example names assigned to attributes. The attribute having the Prompt name may indicate whether an additional parameter is required to execute a function of a voice command, based on Boolean data type. The attribute having the Time name may indicate whether a result of execution of the function varies according to time. The attribute having the Location name may indicate whether a result of execution of the function varies according to a location of the electronic device 101. The attribute having the Device context name may indicate whether a result of execution of the function varies according to a state of the electronic device 101 based on Boolean data type. The attribute having the onDevice supported name may indicate whether the function is executable by the first voice engine 370 based on Boolean data type. Attributes (e.g., attribute having name Prompt, Time, Location, Device context, onDevice supported) included in meta data may include information (e.g., dependency map) managed by the dependency manager 470.

Referring to Table 1, an attribute having Event list name may include a list of one or more functions corresponding to a voice command. For example, names of the one or more functions may be stored in an attribute having Event list name. For example, the fact that text 'message' is stored in an attribute having Event list name may indicate that a voice command corresponding to meta data requests execution of a function of displaying a message. For example, the fact that 'TTS_Response' text is stored in an attribute having Event list name may indicate that a voice command corresponding to meta data requests execution of a TTS function. For example, the fact that 'appLaunch' text is stored in an attribute having Event list name may indicate that a voice command corresponding to meta data requests execution of at least one application installed in the electronic device 101.

Obtaining metadata for a voice command by the electronic device 101 may be performed based on the first voice engine 370 executed with the speech type classifier 410. Based on execution of the natural language processor 460 in the first voice engine 370, the electronic device 101 may perform pre-processing on the natural language included in the voice command. For example, the electronic device 101 may identify whether the voice command may be processed by the first voice engine 370 based on execution of the domain classifier 462. Whether the voice command may be processed by the first voice engine 370 may be stored in an attribute having the onDevice supported name in Table 1. Based on execution of the goal classifier 464, the electronic device 101 may identify a goal of a function (or action) to be executed by the voice command. Based on execution of the dependency manager 470 and/or event handler 475, the electronic device 101 may perform post-processing on the pre-processed voice command. Based on execution of the dependency manager 470, the electronic device 101 may identify a device dependence of resource used to process the voice command. The device dependence may include, for example, whether a function corresponding to the voice command may be processed by the first voice engine 370 and/or the electronic device 101. Based on execution of the event handler 475, the electronic device 101 may obtain a list of functions corresponding to the voice command. The list obtained by the electronic device 101 may be stored in an attribute having Event list name in metadata.

Based on execution of the speech type classifier 410, the electronic device 101 may obtain metadata corresponding to one or more voice commands grouped by a quick command. The obtained metadata may be stored in the memory 130 of the electronic device 101. The electronic device 101 may include an operation of storing the metadata in the memory 130. Registering a quick command by the electronic device 101 may include an operation of storing the metadata in the memory 130.

The electronic device 101 may process the metadata obtained based on execution of the speech type classifier 410, based on the voice command interpreter 420. Based on execution of the voice command interpreter 420, the electronic device 101 may identify information to be stored in the voice command database 430 from the metadata. Based on execution of the metadata analyzer 422, the electronic device 101 may perform parsing the metadata stored in the memory 130, based on the speech type classifier 410. Based on execution of the voice command generator 424, the electronic device 101 may store information parsed by the metadata analyzer 422 in the voice command database 430. An example of a schema of the voice command database 430 will be described with reference to FIG. 5.

As described above, according to an embodiment, the electronic device 101 may obtain metadata corresponding to one or more voice commands matched a quick command, based on an input indicating to register the quick command. The electronic device 101 may store information corresponding to one or more voice commands in the voice command database 430. Based on identifying a speech (e.g., the speech in FIG. 2) including a quick command after registering the quick command, the electronic device 101 may identify one or more voice commands to be executed by the quick command, and attributes of the one or more voice commands, by using the stored metadata. Based on metadata stored in the memory 130 by the speech type classifier 410 and information stored in the voice command database 430, the electronic device 101 may more quickly identify the one or more voice commands and the attributes. An operation performed by the electronic device 101 based on identifying the speech including the quick command will be described with reference to FIG. 6.

Hereinafter, an example of information stored in the voice command database 430 by the electronic device 101 in response to an input indicating to register the quick command will be described with reference to FIG. 5.

Figure 5:
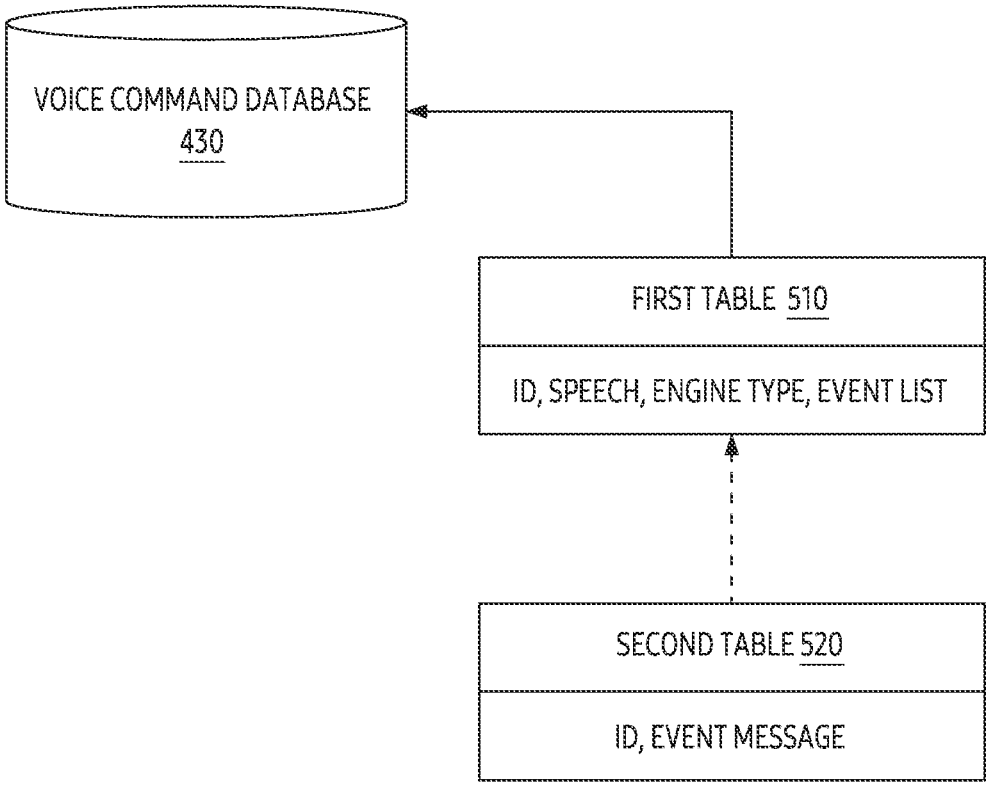
FIG. 5 is a block diagram of a voice command database included in an electronic device, according to an embodiment.

FIG. 5 is a block diagram of a voice command database 430 included in an electronic device, according to an embodiment.

The electronic device of FIG. 5 may be an example of the electronic device 101 of FIG. 3 and FIG. 4. For example, the voice command database 430 of FIG. 4 may include the voice command database 430 of FIG. 5. The voice command database 430 of FIG. 5 may be managed based on the execution of the speech processor 360 of FIG. 3 to FIG. 4.

According to an embodiment, the electronic device may divide information included in the voice command database 430 into a first table 510 for storing parameters corresponding to the voice command and the second table 520 for storing parameters related to one or more events to be executed by the voice command, and store. The electronic device may update the voice command database 430 based on the one or more voice commands, in a state of registering a quick command including one or more voice commands.

In the first table 510 of the voice command database 430, the electronic device may store parameters corresponding to the voice command. Table 2 may include an example of the parameters stored in the first table 510 of the voice command database 430.

TABLE 2

| Name of parameter (or field) | Description |
| --- | --- |
| ID | Identifier of a voice command in the first table 510 of the voice command database 430 |
| Command | Natural language corresponding to a voice command |
| Engine type | A type of voice engine capable of executing a function corresponding to a voice command |
| Static event list | Variability of a function (or event) corresponding to a voice command |
| Event list | A list of events to be performed to display result of execution of one or more functions corresponding to a voice command |

Referring to Table 2, a parameter having ID name may include an identifier (e.g., key value) uniquely assigned to records in the first table 510 of the voice command database 430. A parameter having Command name may include a natural language corresponding to a voice command. A parameter having Engine type name may include a value for identifying a voice engine capable of executing one or more functions corresponding to a voice command. For example, a parameter having Engine type name may include a value indicating whether the one or more functions may be executed by each of a first voice engine (e.g., the first voice engine 370 of FIG. 3) executed by an electronic device and a second voice engine (e.g., the second voice engine 380 of FIG. 3) executed by an external electronic device (e.g., the external electronic device 210 in FIGS. 2 to 3). A parameter having Static event list name may indicate whether a function corresponding to a voice command is changed. A parameter having Event list name may indicate a method in which result of executing one or more functions corresponding to a voice command are outputted. In the first table 510, a parameter having Event list name may include an identifier uniquely assigned to a record of the second table 520. Based on the parameter having Event list name, the electronic device may identify a record in the second table 520 in which a method of outputting results of executing one or more functions of a voice command matched to a specific record of the first table 510 is stored. For example, a parameter having Event list name may be used for a combination (e.g., combination of tables based on join operations) of the first table 510 and the second table 520.

In the second table 520, the electronic device may represent a method in which result of execution of one or more functions of the event voice command are outputted, based on a parameter (or field) having message (event message) name. The parameters may represent the method based on structured text such as JavaScript object notation (JSON). The embodiment is not limited thereto, and a parameter having event message name may indicate a method in which the results are outputted based on an extended marked-up language (xml). In a parameter having Event list name, whether a result of executing the one or more functions will be displayed through a display or in a form of a speech based on natural language may be stored.

As described above with reference to FIG. 4 and FIG. 5, according to an embodiment, the electronic device may process an input indicating to register a quick command for executing a group of a plurality of functions. For example, the quick command may cause a sequential execution of functions (e.g., music playback function, alarm release function, and weather forecast output function) arranged by the user based on a simplified natural language such as "Good Morning". The electronic device may store information used to execute the functions in the memory of the electronic device, in units of voice commands corresponding to each of the functions. The information stored by the electronic device may include a parameter (e.g., a type of an electronic device and/or voice engine in which voice commands may be executed) used for scheduling the voice commands.

After registering a quick command, and one or more voice commands corresponding to the quick command, the electronic device may execute one or more functions corresponding to one or more registered voice commands in response to a speech including the quick command. The electronic device may control scheduling and/or execution of one or more the functions based on execution of the voice command controller 440 of FIG. 4. Hereinafter, an example of an operation performed by an electronic device according to an embodiment based on identifying a quick command from an audio signal outputted from a microphone will be described with reference to FIG. 6 and FIG. 7.

Figure 6:
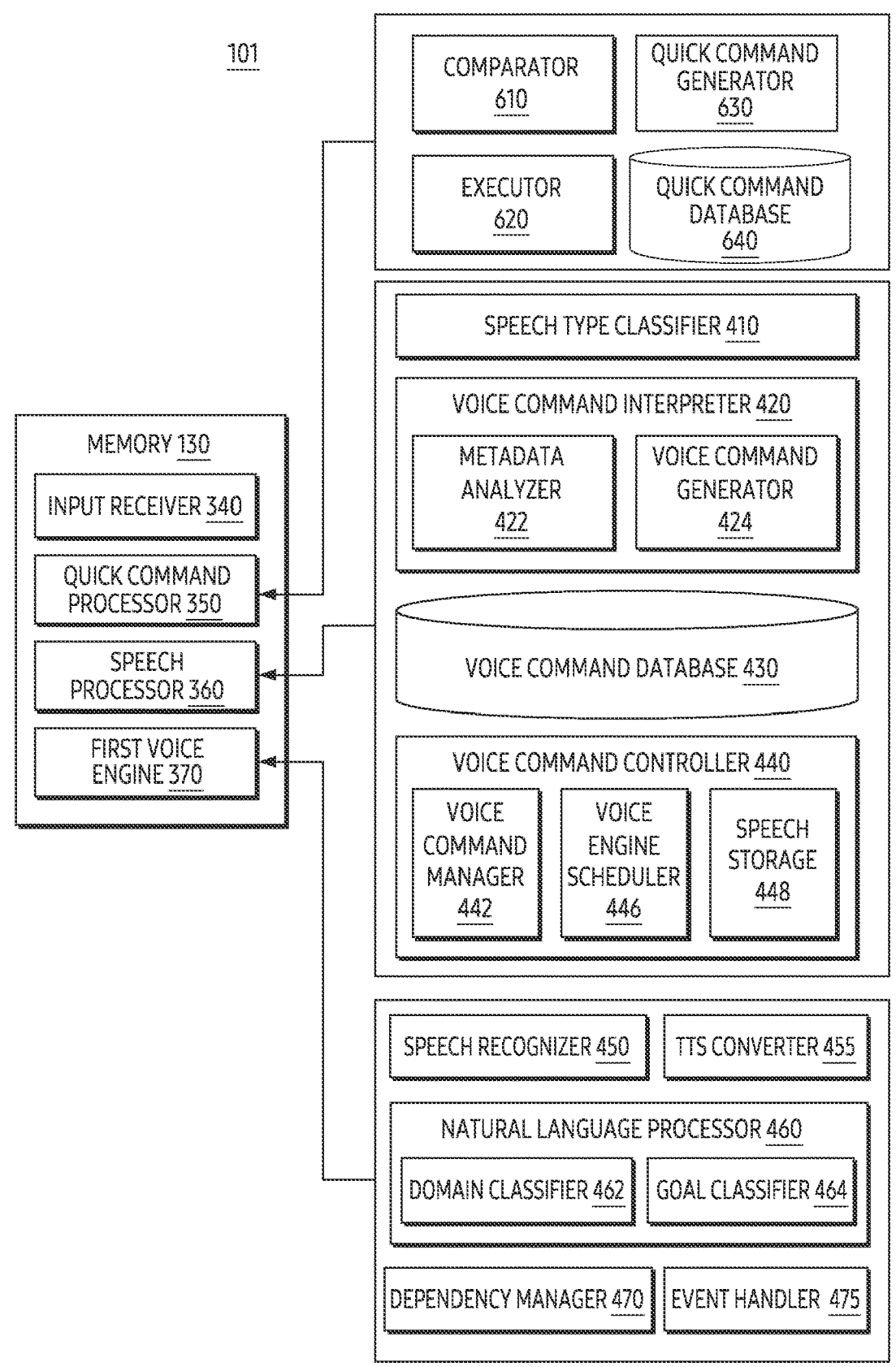
FIG. 6 is a block diagram of a voice command database included in an electronic device, according to an embodiment.

FIG. 6 is a block diagram of a voice command database included in an electronic device, according to an embodiment.

The electronic device 101 of FIG. 6 may be an example of the electronic device 101 of FIG. 3 and FIG. 4. For example, the input receiver 340, the quick command processor 350, the speech processor 360, and the first voice engine 370 executed by the electronic device 101, the memory 130, and the processor 120 of FIG. 3 may include the electronic device 101, the memory 130, the input receiver 340, the quick command processor, the speech processor 360, and the first voice engine 370 of FIG. 6.

Referring to FIG. 6, instructions and/or sub-routines of the quick command processor 350 to identify whether the user's speech includes a quick command may be divided into a comparator 610, an executor 620, and a quick command generator 630. Based on execution of the quick command processor 350, the electronic device 101 may manage a quick command database 640 including information on the quick command in the memory 130. In a state of registering a quick command from the user, the electronic device 101 may store a natural language corresponding to the quick command, a language type (e.g., English), an identifier uniquely assigned to the quick command, and a time when the quick command is registered, in the quick command database 640. The information stored in the quick command database 640 may be stored in an external electronic device connected to the electronic device 101 (e.g., the memory 130 of the external electronic device 210 of FIGS. 2 and 3).

According to an embodiment, the electronic device 101 may identify the user's speech from an audio signal outputted from the microphone (e.g., the microphone 320 of FIG. 3). Identifying a speech by the electronic device 101 may include obtaining a text corresponding to the audio signal, based on execution of the speech recognizer 450 within the first voice engine 370 and/or the second voice engine (e.g., the second voice engine 380 of FIG. 2) of the external electronic device. Based on execution of the comparator 610, the electronic device 101 may identify whether a quick command is included in a speech, by comparing the text and the quick command stored in the quick command database 640.

When a quick command is not included in the speech, the electronic device 101 may identify one or more voice commands included in the speech, based on execution of the speech processor 360. The electronic device 101 may identify metadata corresponding to the one or more voice commands from the memory 130 by the speech type classifier 410. When metadata corresponding to the one or more voice commands is present in the memory 130, the electronic device 101 may identify attributes of the one or more voice commands based on the metadata. Based on the identified attributes, the electronic device 101 may select a voice engine to be used to execute the one or more voice commands, from among the first voice engine 370 or the second voice engine (e.g., the second voice engine 380 of FIG. 3).

When the quick command is not included in the speech and a plurality of voice commands are identified from the speech, the electronic device 101 may process the plurality of voice commands by using at least one of the first voice engine 370 or the second voice engine (e.g., the second voice engine 380 of FIG. 3). For example, the electronic device 101 may select a voice engine of an idle state, from among the first voice engine 370 and the second voice engine. Within the example, the electronic device 101 may sequentially execute a plurality of functions corresponding to the plurality of voice commands, by using the selected voice engine. In order to select a voice engine in the idle state, the electronic device 101 may establish a communication link with an external electronic device (e.g., the external electronic device 210 in FIGS. 2 to 3) on which the second voice engine is executed, or maintain an established communication link.

Based on identifying a quick command included in the speech, the electronic device 101 may perform an operation related to the quick command based on the executor 620. For example, the electronic device 101 may control the execution of the speech processor 360 based on the executor 620. In the state of identifying a quick command included in the speech, the electronic device 101 may identify metadata related to the quick command and parameters stored in the voice command database 430, by executing the speech processor 360. The metadata and the parameters may indicate at least one voice command matched the quick command. When the quick command is registered in the electronic device 101 to execute a plurality of voice commands, the user may execute functions corresponding to the plurality of voice commands by speaking the quick command having a relatively short length, independently of sentences corresponding to each of the plurality of voice commands. When the voice commands frequently executed by the user are grouped into quick commands, the electronic device 101 may execute the plurality of voice commands, by recognizing the relatively short quick command instead of recognizing sentences corresponding to the voice commands.

In the state of identifying information in the voice command database 430 and metadata related to the quick command, the electronic device 101 may obtain a list of at least one voice command corresponding to the quick command based on execution of the voice command controller 440. The electronic device 101 may schedule a voice engine to process the at least one voice command based on the list. In a state that the voice command controller 440 is executed, the electronic device 101 may obtain information on the first voice engine 370 and the second voice engine executed by the external electronic device. The information of the second voice engine may include a latency time and/or delay caused by an external electronic device executing the second voice engine processing a voice command. The information on the second voice engine may include a state (e.g., whether idle state or not) of the second voice engine. The electronic device 101 may divide the at least one voice command corresponding to the quick command, based on whether each of the first voice engine 370 or the second voice engine, indicated by the states of the first voice engine 370 and the second voice engine, can execute at least one function corresponding to the voice command, based on whether each of the first voice engine 370 and the second voice engine can execute at least one function corresponding to a voice command, and that is indicated by states of the first voice engine 370 and the second voice engine. For example, when a plurality of voice commands are identified in the list, the electronic device 101 may divide the plurality of voice commands into a first group to be executed by the first voice engine 370 and a second group to be executed by the second voice engine, based on the states of the first voice engine 370 and the second voice engine.

As described above, according to an embodiment, the electronic device 101 may identify a plurality of voice commands corresponding to the quick command, based on identifying a quick command from the user's speech. The electronic device 101 may obtain the information used for scheduling the plurality of voice commands, based on information (e.g., metadata, and/or voice command database 430) stored in the memory 130 while registering quick commands. The electronic device 101 may select a voice engine to process each of the plurality of voice commands from among different voice engines (e.g., the first voice engine 370 and the second voice engine), by executing the voice command controller 440 based on the information. Hereinafter, an example of an operation in which the electronic device 101 selects a voice engine to process each of the plurality of voice commands in a state in which the voice command controller 440 is executed will be described with reference to FIG. 7.

Figure 7:
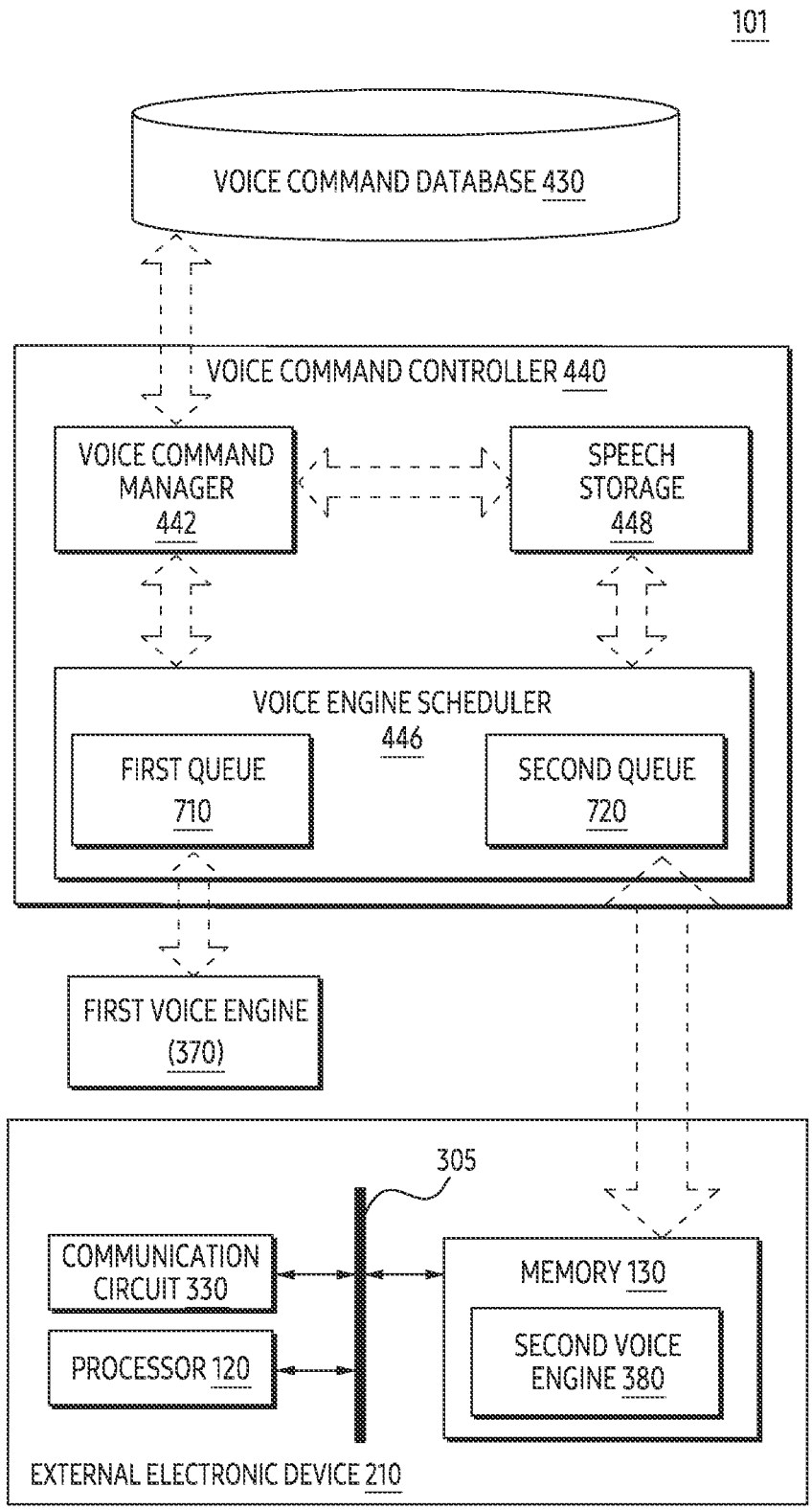
FIG. 7 is a block diagram of a program executed by an electronic device, according to an embodiment.

FIG. 7 is a block diagram of a program executed by an electronic device 101, according to an embodiment.

The electronic device 101 of FIG. 7 may be an example of the electronic device 101 of FIGS. 3 to 6. For example, the first voice engine 370 of FIGS. 3 to 6 may include the first voice engine 370 of FIG. 7. The voice command controller 440 and the voice command database 430 of FIG. 4 may include the voice command controller 440 and the voice command database 430 of FIG. 7. The external electronic device 210 of FIG. 3 may include the external electronic device 210 of FIG. 7.

Referring to FIG. 7, instructions and/or sub-routines of the voice command controller 440 executed by the electronic device 101 may be divided into a voice command manager 442, a voice engine scheduler 446, and/or a speech storage 448. Based on identifying the quick command registered in the electronic device 101 from the speech, the electronic device 101 may execute the voice command controller 440. The electronic device 101 may obtain information required for execution of the voice command controller 440 from the voice command database 430. The electronic device 101 may obtain information related to at least one voice command corresponding to the quick command, from the voice command database 430.

Based on execution of the voice command manager 442, the electronic device 101 may obtain information related to at least one voice command corresponding to a quick command. Based on the information, the electronic device 101 may determine whether to process the at least one voice command based on the voice engine. For example, when a result of executing at least one function corresponding to the voice command is cached in the memory (e.g., the memory 130 of FIG. 3) of the electronic device 101, the electronic device 101 may bypass the processing of voice commands based on the voice engine, and store the cached results in the speech storage 448. Whether to store the results in the speech storage 448 may depend on whether the result identified by the electronic device 101 is valid. When a result of executing at least one function corresponding to the voice command is not cached in the memory or the cached result is invalid, the electronic device 101 may determine to process the voice command based on the voice engine. When a plurality of voice commands correspond to a quick command, the electronic device 101 may identify a voice command to be processed by a voice engine among the plurality of voice commands, based on execution of the voice command manager 442.

The electronic device 101 may perform scheduling for one or more voice commands to be processed by the voice engine, based on execution of the voice engine scheduler 446. The scheduling may include selecting a voice engine to be used to process of the one or more voice commands executed by the electronic device 101, among the first voice engine 370 and the second voice engine 380 executed by the external electronic device 210. In a state of performing scheduling for the plurality of voice commands, the electronic device 101 may allocate the plurality of voice commands to one of a first queue 710 corresponding to the first voice engine 370 and a second queue 720 corresponding to the second voice engine 380. The first queue 710 is an area formed in the memory of the electronic device 101, and may store information on one or more voice commands to be sequentially inputted to the first voice engine 370. The second queue 720 is another area formed in the memory, and may store information on one or more voice commands to be sequentially transmitted to the external electronic device 210. An embodiment in which the electronic device 101 forms the first queue 710 and the second queue 720 having a data structure of First-in First-out (FIFO) based on execution of the voice engine scheduler 446 is illustrated, but it is not limited thereto.

In a state that the voice engine scheduler 446 is executed, the electronic device 101 may store the voice command in any one of the first queue 710 and the second queue 720, based on at least one of states of the first voice engine 370 and/or the second voice engine 380 and attributes of the voice command. For example, based on attribute having the onDevice supported name in Table 1 among the attributes, the electronic device 101 may obtain whether the voice command should be exclusively processed by a specific voice engine (e.g., the second voice engine 380). In response to identifying the voice command having an attribute to be exclusively processed by the second voice engine 380, the electronic device 101 may store the voice command in the second queue 720 among the first queue 710 or the second queue 720. For example, the electronic device 101 may classify voice commands, based on whether each of the first voice engine 370 or the second voice engine 380 is idle. For example, when the second voice engine 380 is in another state different from the idle state, the electronic device 101 may store at least one voice command to be processed by the voice engine in the first queue 710.

Based on execution of the voice engine scheduler 446, the electronic device 101 may calculate total duration during which a plurality of voice commands included in the quick command are processed, by using a cost function. In order to minimize the total duration, the electronic device 101 may classify a plurality of voice commands into one of the first queue 710 and the second queue 720. The cost function may depend on states and/or performance of each of the first voice engine 370 and the second voice engine 380.

The electronic device 101 may directly or indirectly control the voice engines, by using results of classifying the plurality of voice commands corresponding to the quick command into different voice engines based on execution of the voice engine scheduler 446. The electronic device 101 may execute the first voice engine 370 based on at least one voice command accumulated in the first queue 710. The electronic device 101 may transmit at least one signal including at least one voice command accumulated in the second queue 720 to the external electronic device 210 executing the second voice engine 380. Based on the at least one signal, the electronic device 101 may indirectly control the second voice engine 380 executed by the external electronic device 210.

The electronic device 101 may store a result of executing voice commands stored in each of the first queue 710 and the second queue 720, in the memory of the electronic device 101, based on execution of the speech storage 448. Based on execution of the speech storage 448, the electronic device 101 may store a result of processing at least one voice command accumulated in the first queue 710 by using the first voice engine 370, in a memory. Based on execution of the speech storage 448, the electronic device 101 may store a result of processing at least one voice command included in the signal received from the external electronic device 210 and accumulated in the second queue 720, in the memory. The electronic device 101 may store results of processing the voice commands by different voice engines, based on a sequence that is set while registering a quick command and processes the plurality of voice commands. For example, the results accumulated in the memory of the electronic device 101 based on execution of the speech storage 448 may be aligned based on the sequence that processes the plurality of voice commands. Based on execution of the speech storage 448, the electronic device 101 may form a queue in which results of processing the plurality of voice commands are stored in the memory.

The electronic device 101 may obtain audio signals corresponding to each of the results, from the results of processing the plurality of voice commands accumulated in the memory of the electronic device 101 based on the speech storage 448 and corresponding to the quick command. Based on the sequence for the plurality of voice commands, the electronic device 101 may sequentially transmit the audio signals to the speaker. Based on the sequential transmission of the audio signals, the electronic device 101 may output a sound representing the results through the speaker. The audio signals may include a speech (e.g., a natural language sentence) representing the results.

As described above, according to an embodiment, the electronic device 101 may divide and process a plurality of voice commands corresponding to one quick command, by using each of the first voice engine 370 and the second voice engine 380. Since the plurality of voice commands are divided and processed, idle time of each of the first voice engine 370 and the second voice engine 380 may be minimized.

Hereinafter, according to an embodiment, an example of an operation in which the electronic device 101 registers a quick command and processes a plurality of voice commands corresponding to the quick command in response to a speech including the quick command will be described with reference to FIGS. 8A and 8B.

Figure 8A:
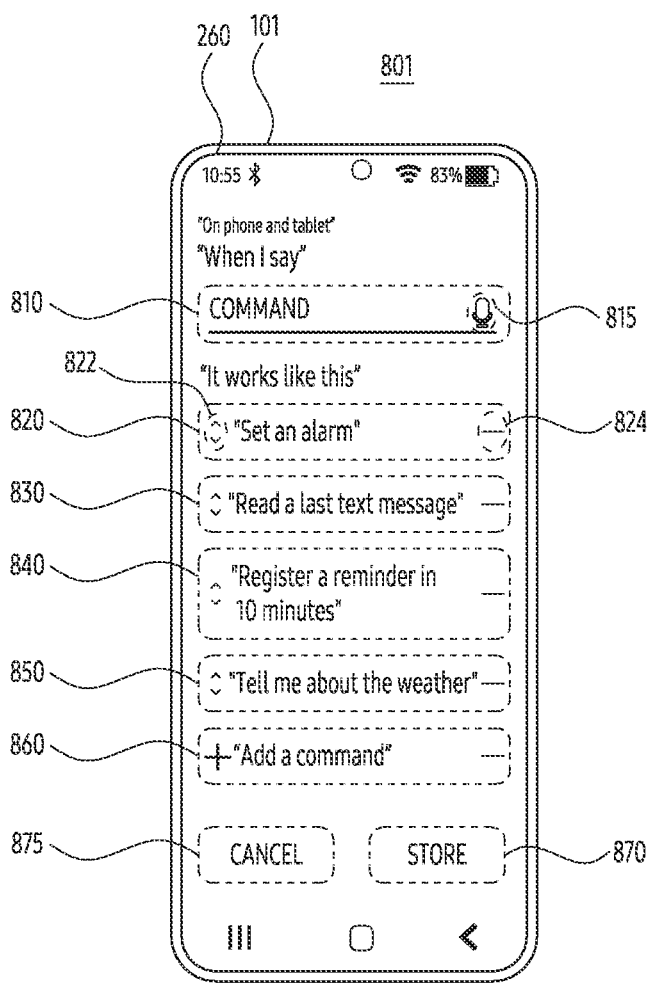
FIGS. 8A and 8B illustrate example states in which an electronic device displays a user interface (UI), according to an embodiment.
Figure 8B:
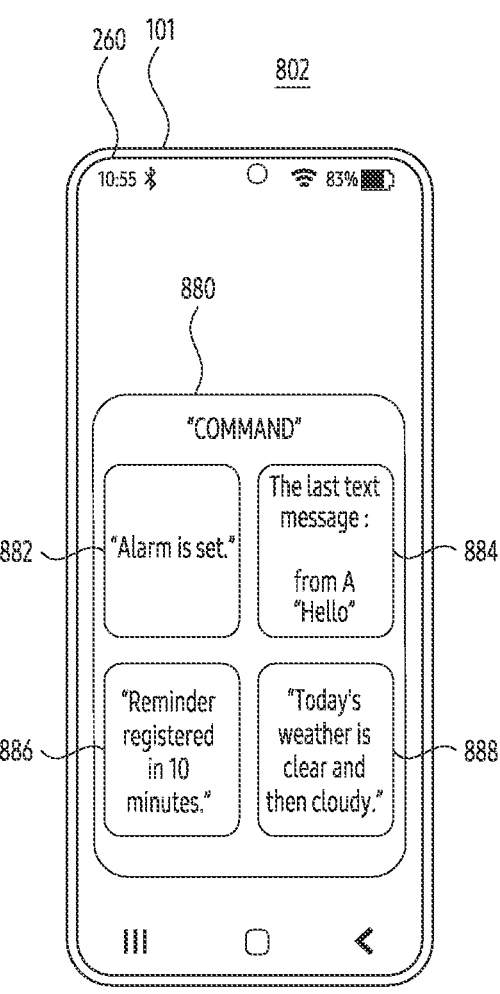

FIGS. 8A and 8B illustrate example states 801 and 802 in which an electronic device displays a user interface (UI), according to an embodiment.

The electronic device 101 of FIGS. 8A and 8B may be an example of the electronic device 101 of FIGS. 3 to 7. For example, the electronic device 101 and the display 260 of FIG. 3 may include the electronic device 101 and the display 260 of FIGS. 8A and 8B. Referring to FIGS. 8A and 8B, different states 801 and 802 in which the electronic device 101 displays the UI provided from an application for recognizing the speech from the audio signal are illustrated. The application may include one or more instructions for executing the input receiver 340, the quick command processor 350, the speech processor 360, and/or the first voice engine 370 of FIG. 3.

Referring to FIG. 8A, in the state 801, the electronic device 101 may display a screen for registration of a quick command in the display 260. In the state 801, the electronic device 101 may receive information required for the registration of a quick command, from the user through the display 260. The electronic device 101 may display a text box 810 for obtaining a natural language to be used for identifying a quick command in the display 260. Along with the text box 810, the electronic device 101 may display a button 815 for obtaining the natural language based on a speech. In response to an input indicating to select the button 815, the electronic device 101 may obtain the natural language from an audio signal obtained by using a microphone.

In the state 801 of FIG. 8A, the electronic device 101 may display a button 860 for adding one or more voice commands executed by a quick command, in the display 260. In response to an input indicating to select the button 860, the electronic device 101 may obtain a voice command through text and/or audio signals. Referring to FIG. 8A, in an example state 801 in which four voice commands are obtained based on a quick command, the electronic device 101 may display visual objects 820, 830, 840, and 850 corresponding to each of the four voice commands in the display 260. A sequence in which visual objects 820, 830, 840, and 850 are arranged in the display 260 may indicate a sequence of executing the fourth voice commands based on the quick command.

In the example state 801 of FIG. 8A, the electronic device 101 may visualize voice commands to be executed by a quick command by using visual objects 820, 830, 840, and 850. The visual object 820 may correspond to a voice command for executing a function related to an alarm. In the visual object 820, the electronic device 101 may display a natural language sentence (e.g., "Set an alarm") representing the voice command. In the visual object 820, the electronic device 101 may display a button 822 for adjusting the sequence in which a voice command corresponding to the visual object 820 is to be executed. In the visual object 820, the electronic device 101 may display a button 824 to exclude the voice command corresponding to the visual object 820 from voice commands to be executed by the quick command. Similarly, in the visual object 830, the electronic device 101 may display a natural language sentence (e.g., "Read a last text message") representing a voice command corresponding to the visual object 830. In the visual object 840, the electronic device 101 may display a natural language sentence (e.g., "Register a reminder in 10 minutes") representing a voice command corresponding to the visual object 840. In the visual object 850, the electronic device 101 may display a natural language sentence (e.g., "Tell me about the weather") representing a voice command corresponding to the visual object 850. Referring to the visual objects 820, 830, 840, and 850 and the text box 810, a speech (e.g., "command") designated for quick commands may differ from the natural language sentences required for execution of the visual objects 820, 830, 840, and 850. For example, a length of the designated speech may be shorter than the natural language sentence.

Referring to FIG. 8A, the electronic device 101 may display a button 870 for registering a quick command, based on information displayed in the display 260. Along with the button 870, the electronic device 101 may display a button 875 for bypassing registration of the quick command. In response to an input indicating to select the button 870, the electronic device 101 may register a quick command executed by text inputted in the text box 810. In order to register a quick command, the electronic device 101 may perform the above-described operation with reference to FIG. 4 and FIG. 5. The electronic device 101 may store information on voice commands corresponding to the visual objects 820, 830, 840, and 850, based on execution of the speech processor 360 of FIG. 3 and FIG. 4. The information may include metadata for the voice commands described with reference to Table 1 and/or attributes for the voice commands described with reference to Table 2. For example, as shown in Table 3, the electronic device 101 may obtain attributes for the voice commands.

TABLE 3

| Voice command | Prompt | Time | Location | Device Context | OnDevice Supported | event list |
|---|---|---|---|---|---|---|
| Set an alarm | ○ | X | X | X | ○ | Message, Renderer, TtsResponse |
| Read a last text message | X | X | X | ○ | ○ | Message, Renderer, TtsResponse |
| Register a reminder in 10 minutes | X | ○ | X | X | ○ | Message, Renderer, TtsResponse |
| Tell me about the weather | NA | NA | NA | NA | X | Message, Renderer, TtsResponse |

The attributes of Table 3 may be stored in metadata for voice commands corresponding to the visual objects 820, 830, 840, and 850. Referring to Table 3, the first voice command corresponding to the visual object 820 may include a natural language sentence (e.g., "Set an alarm") related to an alarm. Since the natural language sentence does not include a parameter (e.g., time) for adjusting the alarm, additional input of the parameter may be required to process the first voice command. In the metadata corresponding to the first voice command, the electronic device 101 may assign a preset value indicating that additional input for processing the first voice command is required within an attribute having Prompt name.

Referring to Table 3, the second voice command corresponding to the visual object 830 may include a natural language sentence (e.g., "Read a last text message") related to a short message service (SMS). The second voice command may depend on a state of the electronic device 101 at the time of processing the second voice command (e.g., a state in which at least one text message is stored in the electronic device 101). In the metadata corresponding to the second voice command, the electronic device 101 may assign a preset value indicating that identifying a state of the electronic device 101 is required to process the second voice command within an attribute having Device context name.

Referring to Table 3, the third voice command corresponding to the visual object 840 may include a natural language sentence (e.g., "Register a reminder in 10 minutes") related to an alarm. The function executed by the third voice command may depend on a time point at which the third voice command is processed. In the metadata corresponding to the third voice command, the electronic device 101 may indicate that a current time point of the electronic device 101 is required to process the third voice command, by assigning a preset value to an attribute having Time name.

Referring to Table 3, the forth voice command corresponding to the visual object 850 may include a natural language sentence (e.g., "Tell me about the weather") for obtaining information through the network. The function executed by the fourth voice command may require communication with an external electronic device (e.g., a third-party server for providing weather information) different from the electronic device 101. In the metadata corresponding to the fourth voice command, the electronic device 101 may indicate that an external electronic device is required to process the fourth voice command, by assigning a preset value to an attribute having onDevice supported name.

As described above with reference to Table 3, the electronic device 101 may obtain attributes of four voice commands matched to a quick command by a user, while registering the quick command identified by the "command" speech. After the state 801 of FIG. 8A, the electronic device 101 may identify the quick command registered to execute the four voice commands, based on identifying "command" speech from audio signals outputted from the microphone. Referring to FIG. 8B, a state 802 in which the electronic device 101 identifies the speech ("command") for executing the quick command after the state 801 of FIG. 8A is illustrated.

In the state 802 of FIG. 8B, the electronic device 101 may obtain metadata described with reference to Table 3, for the four voice commands corresponding to a quick command. Based on the metadata, the electronic device 101 may match each of the voice commands with any one of different voice engines. The voice engines may include a first voice engine (e.g., the first voice engine 370 of FIG. 3) executed by an electronic device 101 and a second voice engine (e.g., the second voice engine 380 of FIG. 3) executed by an external electronic device different from the electronic device 101. The electronic device 101 may allocate the voice commands to the voice engines in order to minimize total duration in which the voice commands are processed based on the voice engines. An operation in which the electronic device 101 directly or indirectly processes the voice commands based on the voice engines after assigning the voice commands to the voice engines may be performed based on the operation described above with reference to FIGS. 6 and 7.

According to an embodiment, the electronic device 101 may sequentially output audio signals representing results of processing the voice commands according to a sequence of the voice commands. For example, the electronic device 101 may sequentially output the audio signals based on a sequence of visual objects 820, 830, 840, and 850 in the state 801 of FIG. 8A.

According to an embodiment, the electronic device 101 may visualize results of processing voice commands in the display 260. The electronic device 101 may display visual objects 882, 884, 886, and 888 corresponding to each of the results in parallel, through a visual object 880 in a form of a pop-up window. A sequence and/or layout in which the electronic device 101 displays visual objects 882, 884, 886, and 888 is not limited to the embodiment of FIG. 8B. Referring to FIG. 8B, in the visual object 882, the electronic device 101 may display information including result of executing the first voice command. In the visual object 884, the electronic device 101 may display information including the result of executing the second voice command. In the visual object 886, the electronic device 101 may display information including the result of executing the third voice command. In the visual object 888, the electronic device 101 may display information including the result of executing the fourth voice command. The electronic device 101 may individually display results of executing the voice commands in parallel using different voice engines, by using visual objects 882, 884, 886, and 888. For example, the electronic device 101 may display result of processing the third voice command using the visual object 886, before the processing of the second voice command is completed.

As described above, according to an embodiment, in response to a speech including a quick command, the electronic device 101 may quickly execute a plurality of voice commands matched to the quick command by using different voice engines. The electronic device 101 may output audio signals representing results of processing the plurality of voice commands by using a speaker. The electronic device 101 may display the results in parallel in the display 260. The embodiment is not limited thereto, and for example, the electronic device 101 may display sequentially the results in the display 260. Since the electronic device 101 displays the results in parallel through the display 260, the electronic device 101 may display result of processing another voice command to a user, independently of failure of processing of a specific voice command among the plurality of voice commands.

Figure 9:
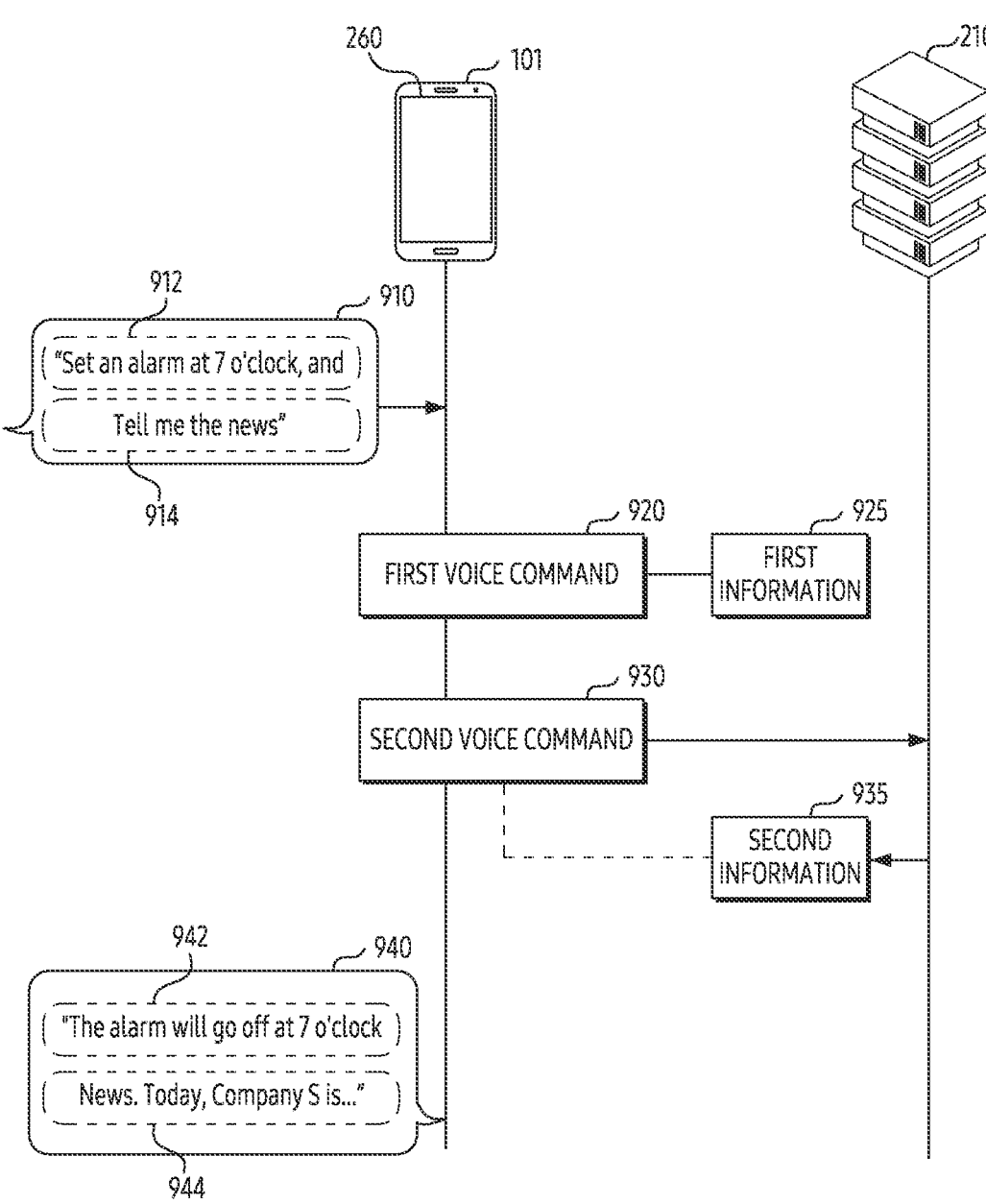
FIG. 9 illustrates an operation in which an electronic device executes a plurality of functions based on a speech, according to an embodiment.

FIG. 9 illustrates an operation in which an electronic device 101 executes a plurality of functions based on a speech 910, according to an embodiment.

The electronic device 101 of FIG. 9 may be an example of the electronic device 101 of FIGS. 3 to 7. For example, the electronic device 101 of FIG. 3 and the display 260 may include the electronic device 101 of FIG. 9 and the display 260. The external electronic device 210 of FIG. 9 may include the external electronic device 210 of FIG. 2 and/or FIG. 7.

According to an embodiment, the electronic device 101 may identify the speech 910 including a plurality of voice commands. The speech 910 may be identified from an audio signal outputted through a microphone included in the electronic device 101. Referring to FIG. 9, the electronic device 101 may identify a first voice command 920 corresponding to a function for reserving an alarm, from a first portion 912 (e.g., "Set an alarm at 7 o'clock") in the natural language sentence included in the speech 910. The electronic device 101 may identify a second voice command 930 corresponding to a function for outputting information collected from the network, from a second portion 914 (e.g., "Tell me the news") in the natural language sentence included in the speech 910. The electronic device 101 may identify the voice commands 920 and 930 from the speech 910, based on execution of the speech processor 360 of FIG. 4.

Based on identifying a plurality of voice commands (e.g., the first voice command 920 and the second voice command 930) from the speech 910, the electronic device 101 may input a plurality of voice commands to at least one of voice engines executed by different electronic devices. The voice engines may include a first voice engine (e.g., the first voice engine 370 in FIG. 3) executed by the electronic device 101 and a second voice engine (e.g., the second voice engine 380 in FIG. 3) executed by the external electronic device 210 connected to the electronic device 101.

Referring to FIG. 9, the electronic device 101 may obtain first information 925 including a result of processing the first voice command 920, by processing the first voice command

920 by using the first voice engine. The electronic device 101 may transmit a signal including the second voice command 930 to the external electronic device 210 to process the second voice command 930 by using the second voice engine. The electronic device 101 may receive another signal including second information 935, as a response to the signal from the external electronic device 210. The second information 935 included in the other signal may include a result of processing the second voice command 930 by the external electronic device 210 executing the second voice engine.

According to an embodiment, the electronic device 101 may output a speech 940 including information (e.g., the first information 925 and the second information 935) including results of processing a plurality of voice commands (e.g., the first voice command 920 and the second voice command 930) identified from the speech 910, to a user. The electronic device 101 may output the speech 940 by using an audio signal transmitted to a speaker. Referring to FIG. 9, the speech 940 may include a natural language sentence 942 (e.g., "The alarm will go off at 7 o'clock") based on the first information 925 which is the result of processing the first voice command 920 and a natural language sentence 944 (e.g., "news. Today, Company S is . . . ") based on the second information 935 which is the result of processing the second voice command 930.

As described above, according to an embodiment, the electronic device 101 may identify an input for processing a plurality of voice commands, based on a speech including quick commands (e.g., the speech 220 in FIG. 2) and/or a speech expressing a plurality of voice commands (e.g., the speech 910 in FIG. 9). Based on the input, the electronic device 101 may process the plurality of voice commands in parallel, based on states of the first voice engine executed by the electronic device 101 and the second voice engine executed by the external electronic device 210. When the plurality of voice commands are processed in parallel in response to a quick command, the electronic device 101 may sequentially display results of processing the plurality of voice commands in parallel, according to a sequence of the plurality of voice commands arranged by the quick command.

Figure 10:
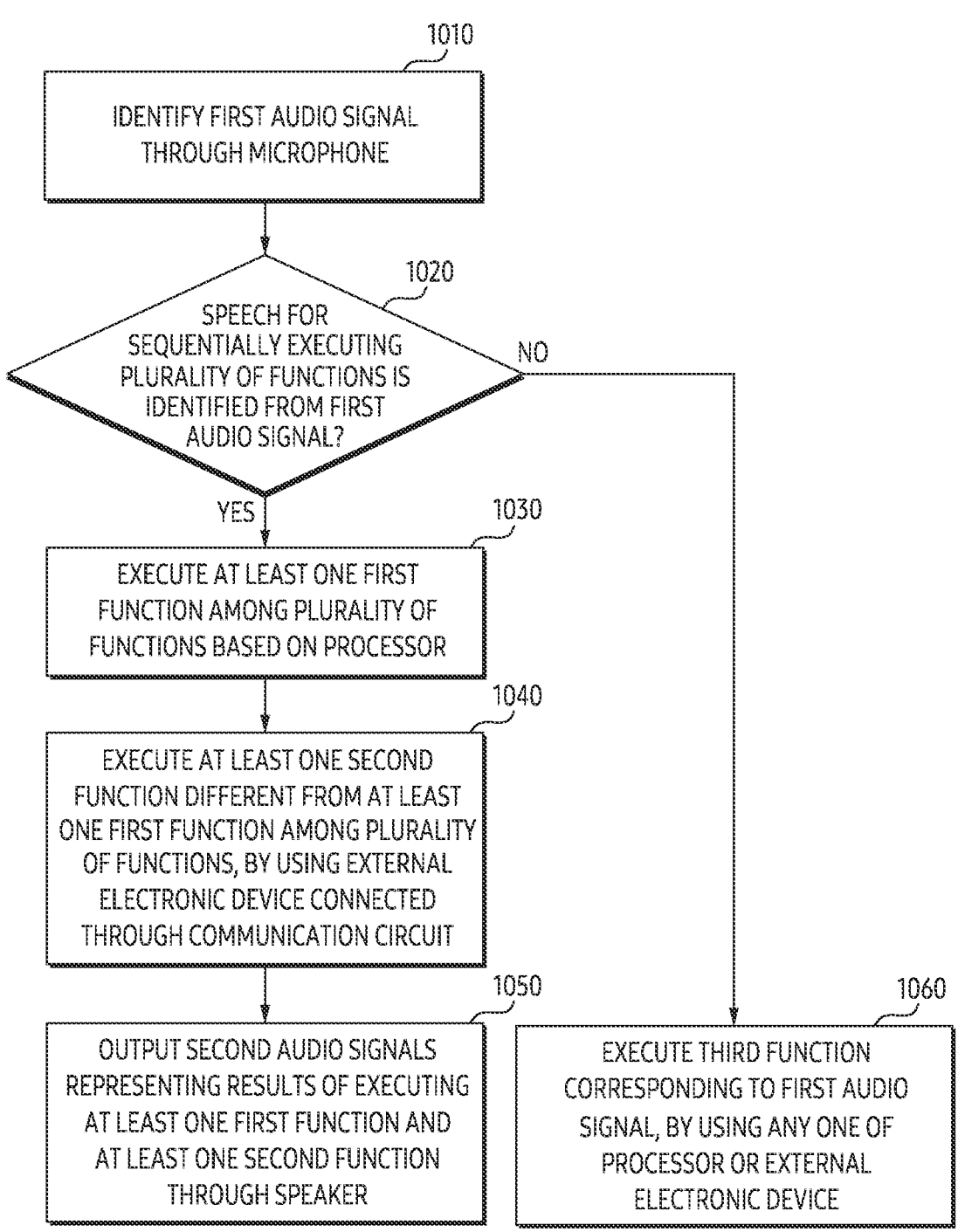
FIG. 10 is a flowchart of an operation performed by an electronic device, according to an embodiment.

FIG. 10 is a flowchart of an operation performed by an electronic device, according to an embodiment.

The electronic device of FIG. 10 may include the electronic device 101 of FIGS. 1-9. At least one of the operations of FIG. 10 may be executed by the electronic device 101 of FIG. 3 and/or the processor 120 in the electronic device 101 of FIG. 3. In the following embodiment, each operation may be performed sequentially, but is not necessarily performed sequentially. For example, the sequence of each operation may be changed, and at least two operations may be performed in parallel.

Referring to FIG. 10, in operation 1010, according to an embodiment, an electronic device may identify a first audio signal through a microphone. The first audio signal may indicate vibration of an external space including the microphone. The microphone of operation 1010 may include at least one of a microphone connected to the electronic device by wire, such as the microphone 320 and headphones of FIG. 3, or a microphone connected wirelessly to the electronic device through the communication circuit 330 of FIG. 3, such as wireless earphones.

Referring to FIG. 10, in operation 1020, according to an embodiment, the electronic device may determine whether a speech for sequentially executing a plurality of functions is identified from the first audio signal. The speech may include a natural language registered in the electronic device to execute a quick command, such as the speech 220 of FIG. 2. The speech may include natural language sentences representing a plurality of functions, such as the speech 910 of FIG. 9.

According to an embodiment, in a state of identifying a speech for sequentially executing a plurality of functions from the first audio signal (1020—YES), based on operation 1030, the electronic device may execute at least one first function among the plurality of functions based on the processor. In the state, based on operation 1040, the electronic device may execute at least one second function different from the at least one first function among the plurality of functions, by using an external electronic device (e.g., the external electronic device 210 of FIG. 3) connected through a communication circuit (e.g., the communication circuit 330 of the electronic device 101 of FIG. 3). In order to perform operations 1030 and 1040, the electronic device may divide the plurality of functions matched to the speech identified from the first audio signal into the at least one first function and the at least one second function to be executed by the processor of the electronic device.

An operation in which the electronic device divides the plurality of functions into the at least one first function and the at least one second function may be performed based on the operation described above with reference to FIG. 6 and FIG. 7. For example, the electronic device may divide the plurality of functions into the at least one first function and the at least one second function, based on states of the first voice engine executed by the processor and the second voice engine executed by the external electronic device. The electronic device may process the at least one first function divided among the plurality of functions based on operation 1030 by using the first voice engine executed by the processor of the electronic device. The electronic device may transmit the at least one second function to the external electronic device based on operation 1040, and obtain a result of executing the at least one second function from the external electronic device.

Referring to FIG. 10, in operation 1050, according to an embodiment, the electronic device may output second audio signals representing results of executing at least one first function and at least one second function through a speaker. The electronic device may output the second audio signals as a response to the speech identified through the first audio signal. Each of the second audio signals may include a natural language sentence representing results of processing each of a plurality of functions of operation 1020. A sequence of natural language sentences outputted from the electronic device by the second audio signals may correspond to a sequence of a plurality of functions indicated by the speech.

When a speech for executing a single function (e.g., a third function) is identified from the first audio signal (1020—NO), based on operation 1060, the electronic device may execute a third function corresponding to the first audio signal by using any one a processor of the electronic device or an external electronic device. The electronic device may identify a state of the first voice engine executed by the processor and/or a state of the second voice engine executed by the external electronic device. For example, the electronic device may execute the third function, by using a voice engine in the idle state among the first voice engine or the second voice engine. In operation 1060, similar to operation 1050, the electronic device may output a third audio signal representing the result of executing the third function.

As described above with reference to operations 1050 and 1060, the electronic device may output second audio signals and/or third audio signals based on a speech included in the first audio signal. The embodiment is not limited thereto, and as described above with reference to FIG. 8B, the electronic device may visualize results of executing one or more functions corresponding to the speech identified by operation 1020, by using the display in the electronic device.

Figure 11:
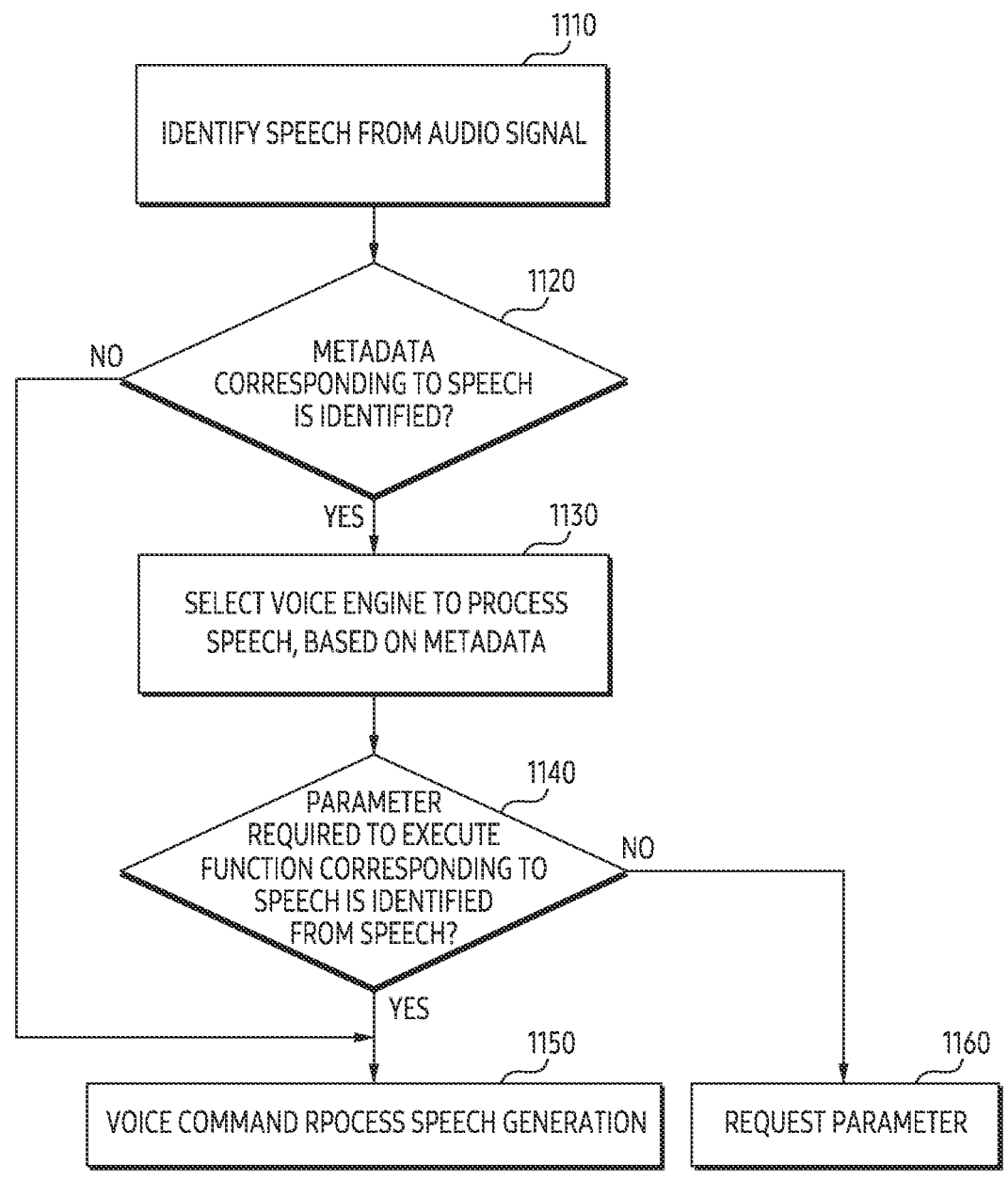
FIG. 11 is a flowchart of an operation performed by an electronic device, according to an embodiment.

FIG. 11 is a flowchart of an operation performed by an electronic device, according to an embodiment.

The electronic device of FIG. 11 may include the electronic device 101 of FIGS. 1-9. At least one of the operations of FIG. 11 may be executed by the processor 120 in the electronic device 101 of FIG. 3 and/or the electronic device 101 of FIG. 3. At least one of the operations of FIG. 11 may be related to at least one of the operations of FIG. 10. In the following embodiment, each operation may be performed sequentially, but is not necessarily performed sequentially. For example, a sequence of each operation may be changed, and at least two operations may be performed in parallel.

Referring to FIG. 11, in operation 1110, according to an embodiment, the electronic device may identify a speech from an audio signal. The electronic device may identify a speech by using the first voice engine executed by the processor of the electronic device, or may identify the speech by using the second voice engine executed by the external electronic device connected to the electronic device. Identifying a speech by the electronic device may include obtaining text data corresponding to the speech.

Referring to FIG. 11, in operation 1120, according to an embodiment, the electronic device may determine whether metadata corresponding to the speech is identified. The metadata may be identified by using a speech processor (e.g., the speech processor 360 in FIG. 3) executed by the electronic device.

In a state of identifying metadata corresponding to a speech (1120—YES), based on operation 1130, the electronic device may select a voice engine to process a speech based on the metadata identified by operation 1120. The electronic device may select a voice engine for executing one or more functions related to the speech from among the first voice engine or the second voice engine. When a plurality of voice commands are identified from the speech, the electronic device may perform independently operation 1130 for each of the plurality of voice commands. For example, based on operation 1130, a voice engine to which each of the plurality of voice commands is processed may be independently selected from among the first voice engine or the second voice engine. The electronic device may select a voice engine to process a speech from among the first voice engine and the second voice engine, based on attributes in the meta data. For example, when an attribute indicating that the speech is selectively executed by a specific voice engine is identified through the metadata, the electronic device may select a voice engine to process the speech based on the attribute. When metadata corresponding to the speech is not identified (1120—NO), a selection of a voice engine based on operation 1130 may be bypassed.

Referring to FIG. 11, in operation 1140, according to an embodiment, the electronic device may determine whether a parameter required to execute a function corresponding to a speech is identified from the speech. When the parameter is not identified from a speech (1140—NO), based on operation 1160, the electronic device may request a parameter required to execute the function from the user. When the parameters are identified from a speech or the function does not require any parameters (1140—YES), based on operation 1150, the electronic device may process the speech by using a voice engine. The electronic device may output a result of processing the speech (e.g., result of executing one or more voice commands included in the speech) by using a speaker and/or a display.

FIG. 12 is a flowchart of an operation performed by an electronic device, according to an embodiment.

The electronic device of FIG. 12 may include the electronic device 101 of FIGS. 1-9. At least one of the operations of FIG. 12 may be executed by the electronic device 101 of FIG. 3 and/or the processor 120 in the electronic device 101 of FIG. 3. At least one of the operations of FIG. 12 may be related to at least one of the operations of FIGS. 10 to 11. In the following embodiment, each operation may be performed sequentially, but is not necessarily performed sequentially. For example, a sequence of each operation may be changed, and at least two operations may be performed in parallel.

Referring to FIG. 12, in operation 1210, according to an embodiment, the electronic device may identify a speech included in the first audio signal received through the microphone. The electronic device may perform operation 1210 of FIG. 12, similar to operation 1110 of FIG. 11.

Referring to FIG. 12, in operation 1220, according to an embodiment, the electronic device may obtain states of the first voice engine executed by the processor and the second voice engine executed by the external electronic device, based on identifying a plurality of voice commands from a speech. Based on identifying a quick command for executing a group of the plurality of voice commands within a speech, the electronic device may perform operation 1220. The states obtained by the electronic device based on operation 1220 may indicate whether the first voice engine and/or the second voice engine are in the idle state.

Referring to FIG. 12, in operation 1230, according to an embodiment, based on states, the electronic device may divide a plurality of voice commands into a first voice command corresponding to the first voice engine and a second voice command corresponding to the second voice engine. The electronic device may divide, based on possibility of executing a function of each of the first voice engine or the second voice engine, the each of the plurality of functions into the at least one first function and the at least one second function, the possibility being indicated by the states. The electronic device may divide, based on feasibility, which is indicated by the states, of a function of each of the first voice engine or the second voice engine, the each of the plurality of functions into the at least one first function and the at least one second function, the possibility being indicated by the states. Based on operation 1230, the electronic device may perform scheduling for the plurality of voice commands of operation 1220. The electronic device may store the first voice command and the second voice command in different areas (e.g., the first queue 710 and the second queue 720 of FIG. 7) in the memory of the electronic device.

Referring to FIG. 12, in operation 1240, according to an embodiment, the electronic device may execute a first function corresponding to the first voice command by using the first voice engine. Since the first voice engine is executed by the processor of the electronic device, the electronic device may selectively process the first voice command among the plurality of voice commands, based on operation 1240.

Referring to FIG. 12, in operation 1250, according to an embodiment, the electronic device may request execution of the second function corresponding to the second voice command to the external electronic device. The electronic device may request execution of the second function by transmitting information related to the second voice command to the external electronic device executing the second voice engine. The electronic device may receive a signal and/or information including a result of execution of the second function as a response to the request from the external electronic device. The sequence in which the electronic device executes operations 1240 and 1250 is not limited to an embodiment of FIG. 12. For example, the electronic device may perform operations 1240 and 1250 in parallel.

Referring to FIG. 12, in operation 1260, according to an embodiment, the electronic device may output a second audio signal representing results of execution of the first function and the second function, based on a sequence of a plurality of voice commands indicated by a speech. A sound outputted by the electronic device through the second audio signal may include natural language sentences representing results of execution of the first function and the second function. A sequence in which the natural language sentences are outputted may depend on a sequence in which the plurality of voice commands are processed, set in a state of registering a quick command.

Figure 13:
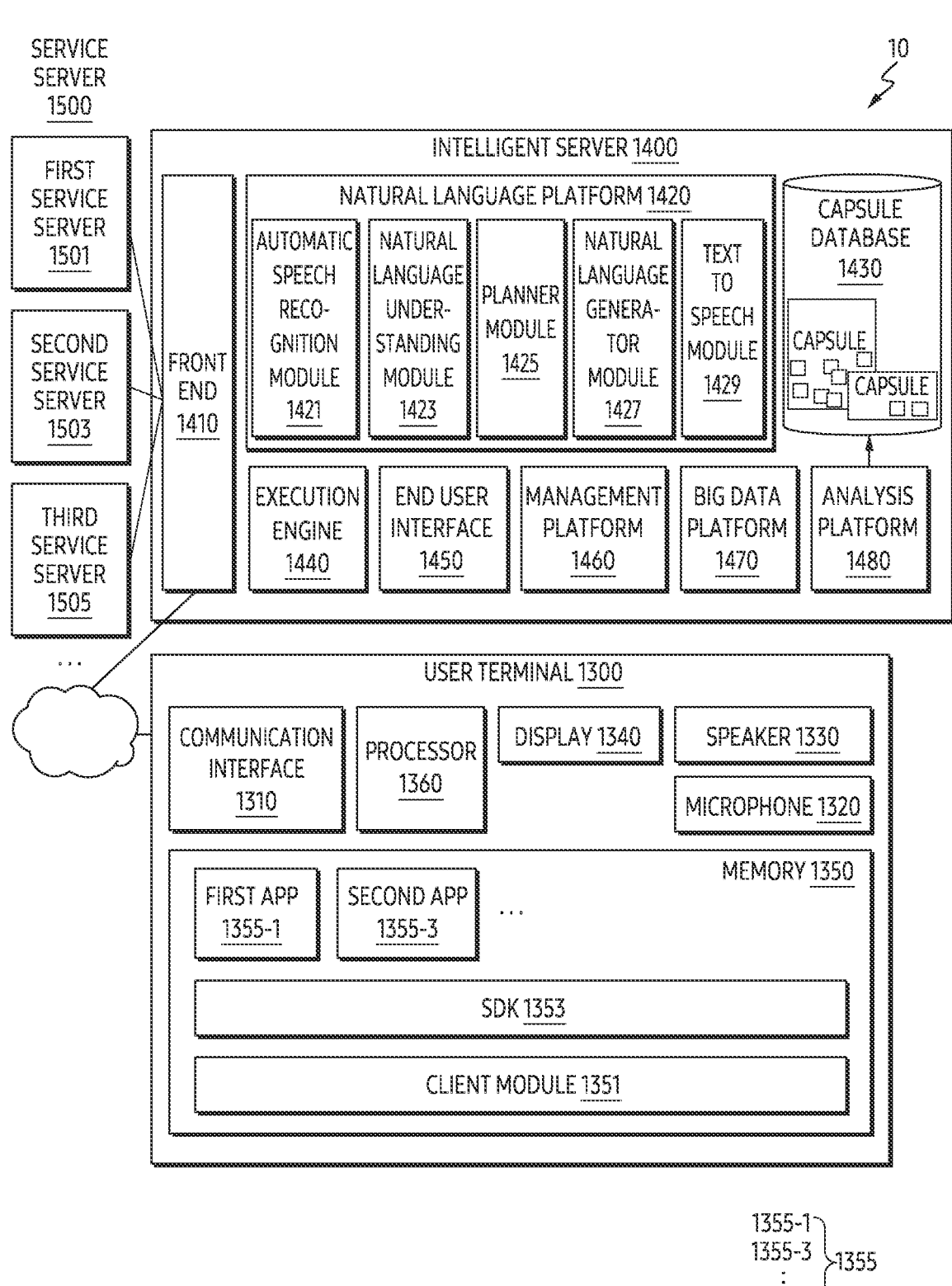
FIG. 13 is a block diagram illustrating an artificial intelligence (AI) system, according to an embodiment.

FIG. 13 is a block diagram illustrating an artificial intelligence (AI) system according to an embodiment.

Referring to FIG. 13, an artificial intelligence system 13 according to an embodiment may include a user terminal 1300, an intelligent server 1400, and a service server 1500.

The user terminal 1300 (e.g., the electronic device 131 of FIG. 1) according to an embodiment may be a terminal device (or electronic device) connectable to the Internet, and for example, it may be mobile phone, smartphone, personal digital assistant (PDA), laptop computer, TV, white goods, wearable device, HMD, or a smart speaker.

According to an embodiment, the user terminal 1300 may include a communication interface 1310, a microphone 1320, a speaker 1330, a display 1340, a memory 1350, and a processor 1360. The components listed above may be operably or electrically connected to each other.

According to an embodiment, the communication interface 1310 may be configured to be connected to an external device to transmit and receive data. According to an embodiment, the microphone 1320 may receive sound (e.g., user speech) and convert it into an electrical signal. According to an embodiment, the speaker 1330 may output an electrical signal as sound (e.g., voice). According to an embodiment, the display 1340 may be configured to display an image or video. According to an embodiment, the display 1340 may display a graphic user interface (GUI) of an app (or application program) being executed.

The display 1340 according to an embodiment may be configured to display an image or video. The display 1340 according to an embodiment may also display the graphic user interface (GUI) of an app (or application program) being executed. The display 1340 according to an embodiment may receive a touch input through a touch sensor. For example, the display 1340 may receive a text input through a touch sensor in image keyboard area displayed in the display 1340.

According to an embodiment, the memory 1350 may store a client module 1351, a software development kit (SDK) 1353, and a plurality of apps 1355. The client module 1351 and the SDK 1353 may comprise a framework (or solution program) to perform general functions. In addition, the client module 1351 or the SDK 1353 may comprise a framework for processing user input (e.g., voice input, text input, touch input).

According to an embodiment, the plurality of apps 1355 may be programs for performing a designated function. According to an embodiment, a plurality of apps 1355 may include a first app 1355_1 and a second app 1355_3. According to an embodiment, each of the plurality of apps 1355 may include a plurality of operations for performing a designated function. For example, the plurality of apps 1355 may include at least one of alarm app, message app, and schedule app. According to an embodiment, the plurality of apps 1355 may be executed by the processor 1360 to sequentially execute at least portion of the plurality of operations.

According to an embodiment, the processor 1360 may control overall operation of the user terminal 1300. For example, the processor 1360 can be electrically connected to the communication interface 1310, the microphone 1320, the speaker 1330, the display 1340, and the memory 1350 to perform a designated operation.

According to an embodiment, the processor 1360 may also execute a program stored in the memory 1350 to perform a designated function. For example, the processor 1360 may execute at least one of the client module 1351 or the SDK 1353 to perform the following operations to process user input. For example, the processor 1360 may control operations of the plurality of apps 1355 through the SDK 1353. The following operations described as operations of the client module 1351 or the SDK 1353 may be operation by execution of the processor 1360.

According to an embodiment, the client module 1351 may receive a user input. For example, the client module 1351 may generate a voice signal corresponding to a user speech detected through the microphone 1320. Alternatively, the client module 1351 may receive a touch input detected through the display 1340. Alternatively, the client module 1351 may receive a text input detected through a keyboard or an image keyboard. In addition, the client module 1351 may receive various types of user input detected through an input module included in the user terminal 1300 or an input module connected to the user terminal 1300. The client module 1351 may transmit the received user input to the intelligent server 1400. According to an embodiment, the client module 1351 may transmit state information of the user terminal 1300 to the intelligent server 1400 together with the received user input. For example, the state information may be execution state information of an app.

According to an embodiment, the client module 1351 may receive a result corresponding to the received user input. For example, the client module 1351 may receive a result corresponding to a user input from the intelligent server 1400. The client module 1351 may display the received result on the display 1340. In addition, the client module 1351 may output the received result as audio through the speaker 1330.

According to an embodiment, the client module 1351 may receive a plan corresponding to the received user input. The client module 1351 may display a result of executing a plurality of operations of an app according to the plan on the display 1340. For example, the client module 1351 may sequentially display the execution results of the plurality of operations on the display and output audio through the speaker 1330. For another example, the user terminal 1300 may display a portion of result (e.g., the result of the last operation) of executing the plurality of operations on the display, and output audio through the speaker 1330.

According to an embodiment, the client module 1351 may receive a request for obtaining information necessary to calculate a result corresponding to a user input from the intelligent server 1400. For example, information required to calculate the result may be state information of the user terminal 1300. According to an embodiment, the client module 1351 may transmit the necessary information to the intelligent server 1400 in response to the request.

According to an embodiment, the client module 1351 may transmit result information executing a plurality of operations according to a plan to the intelligent server 1400. The intelligent server 1400 may identify that the user input received through the result information is correctly processed.

According to an embodiment, the client module 1351 may include a voice recognition module. According to an embodiment, the client module 1351 may recognize a voice input performing a limited function through the voice recognition module. For example, the client module 1351 may perform an intelligent app to process voice input for performing organic operations through a designated input (e.g., wake up!).

According to an embodiment, the intelligent server 1400 may receive information related to a user voice input from the user terminal 1300 through a communication network. According to an embodiment, the intelligent server 1400 may change data related to the received voice input into text data. According to an embodiment, the intelligent server 1400 may generate a plan for performing a task corresponding to a user voice input based on the text data.

According to an embodiment, the plan may be generated by an artificial intelligence (AI) system. The AI system may be a rule-based system, or a neural network-based system (e.g., feedforward neural network (FNN), or recurrent neural network (RNN)). Alternatively, it may be a combination of the described above or an artificial intelligence system different therefrom. According to an embodiment, a plan may be selected from a set of predefined plans or may be generated in real time in response to a user request. For example, the AI system may select at least one plan from a plurality of predefined plans.

According to an embodiment, the intelligent server 1400 may transmit a result calculated according to the generated plan to the user terminal 1300 or transmit the generated plan to the user terminal 1300. According to an embodiment, the user terminal 1300 may display a result calculated according to a plan on a display. According to an embodiment, the user terminal 1300 may display a result of executing an operation according to a plan on a display.

The intelligent server 1400 according to an embodiment may include a front end 1410, a natural language platform 1420, a capsule DB 1430, an execution engine 1440, an end user interface 1450, a management platform 1460, a big data platform 1470, and an analysis platform 1480.

According to an embodiment, the front end 1410 may receive a user input received from the user terminal 1300. The front end 1410 may transmit a response corresponding to the user input.

According to an embodiment, the natural language platform 1420 may include an automatic speech recognition module (ASR module) 1421, a natural language understanding module (NLU module) 1423, a planner module 1425, a natural language generator module (NLG module) 1427, and a text to speech module (TTS module) 1429.

According to an embodiment, the automatic speech recognition module 1421 may convert a voice input received from the user terminal 1300 into text data. According to an embodiment, the natural language understanding module 1423 may understand a user's intention using text data of a voice input. For example, the natural language understanding module 1423 may perform syntactic analyze or semantic analyze on user input in a form of text data to understand the user's intention. According to an embodiment, the natural language understanding module 1423 may understand the meaning of words extracted from user input by using linguistic features (e.g., grammatical elements) of morphemes or phrases, and determine user's intention by matching the meaning of the identified word to the intention. The natural language understanding module 1423 may obtain intent information corresponding to user speech. The intent information may be information indicating a user's intention determined by interpreting text data. The intent information may include information indicating an operation or function that the user wants to execute using the device.

According to an embodiment, the planner module 1425 may generate a plan by using intention and parameter determined by the natural language understanding module 1423. According to an embodiment, the planner module 1425 may determine a plurality of domains necessary to perform a task based on the determined intention. The planner module 1425 may determine a plurality of operations included in each of the plurality of domains determined based on the intention. According to an embodiment, the planner module 1425 may determine a parameter required to execute the plurality of determined operations or a result value outputted by the execution of the plurality of operations. The parameter and the result value may be defined as a concept related to a designated format (or class). Accordingly, the plan may include a plurality of operations and a plurality of concepts determined by the intention of the user. The planner module 1425 may determine a relationship between the plurality of operations and the plurality of concepts in stages (or hierarchical). For example, the planner module 1425 may determine execution order of a plurality of operations determined based on the user's intention, based on a plurality of concepts. In other words, the planner module 1425 may determine execution order of plurality of operations, based on a parameter required for the execution of the plurality of operations and a results outputted by the execution of the plurality of operations. Accordingly, the planner module 1425 may generate a plan including association information (e.g., ontology) between the plurality of operations and the plurality of concepts. The planner module 1425 may generate a plan by using information stored in the capsule database 1430 where a set of relationships between concept and operation is stored.

According to an embodiment, the natural language generation module 1427 may change a designated information into text form. The information changed to text form may be a form of natural language speech. The text voice conversion module 1429 according to an embodiment may change text-type information into voice-type information.

According to an embodiment, the capsule database 1430 may store information on a relationship between a plurality of concepts corresponding to a plurality of domains and operations. For example, the capsule database 1430 may store a plurality of capsules including a plurality of action object (or action information) and concept object (or concept information) of the plan. According to an embodiment, the capsule database 1430 may store the plurality of capsules in a form of a concept action network (CAN). According to an embodiment, a plurality of capsules may be stored in a function registry included in the capsule database 1430.

According to an embodiment, the capsule database 1430 may include a strategy registry in which strategy information required when determining a plan corresponding to a voice input is stored. The strategy information may include reference information for determining one plan when a plurality of plans corresponding to a user input exist. According to an embodiment, the capsule database 1430 may include a follow-up registry in which information on a follow-up operation for proposing a follow-up operation to the user in a designated situation is stored. The follow-up may include, for example, follow-up speech. According to an embodiment, the capsule database 1430 may include a layout registry for storing layout information of information outputted through the user terminal 1300. According to an embodiment, the capsule database 1430 may include a vocabulary registry in which vocabulary information included in capsule information is stored. According to an embodiment, the capsule database 1430 may include a dialog registry in which dialog (or interaction) information with a user is stored.

According to an embodiment, the capsule database 1430 may update an object stored through a developer tool. For example, the developer tool may include a function editor for updating an action object or concept object. The developer tool may include a vocabulary editor for updating a vocabulary. The developer tool may include a strategy editor that generates and registers a strategy for determining a plan. The developer tool may include a dialog editor that generates a dialog with a user. The developer tool may include a follow-up editor activating subsequent goal and editing subsequent speech that provide hints. The subsequent goal may be determined based on a currently set goal, user preference, or environmental condition.

According to an embodiment, the capsule database 1430 may also be implemented in the user terminal 1300. In other words, the user terminal 1300 may include a capsule database 1430 storing information for determining an operation corresponding to a voice input.

According to an embodiment, the execution engine 1440 may calculate a result by using the generated plan. According to an embodiment, the end user interface 1450 may transmit the calculated result to the user terminal 1300. Accordingly, the user terminal 1300 may receive the result and provide the received result to the user. According to an embodiment, the management platform 1460 may manage information used in the intelligent server 1400. According to an embodiment, the big data platform 1470 may collect user data. According to an embodiment, the analysis platform 1480 may manage a quality of service (QoS) of the intelligent server 1400. For example, the analysis platform 1480 may manage components and processing speed (or efficiency) of the intelligent server 1400.

According to an embodiment, the service server 1500 may provide a designated service (e.g., food order or hotel reservation) to the user terminal 1300. According to an embodiment, the service server 1500 may be a server operated by a third party. For example, the service server 1500 may include a first service server 1501, a second service server 1503, and a third service server 1505 operated by different third parties. According to an embodiment, the service server 1500 may provide information for generating a plan corresponding to the received voice input to the intelligent server 1400. For example, the provided information may be stored in the capsule database 1430. In addition, the service server 1500 may provide result information according to the plan to the intelligent server 1400.

In the artificial intelligence system 13 described above, the user terminal 1300 may provide various intelligent services to the user in response to user input. For example, the user input may include an input through a physical button, a touch input, or a voice input.

According to an embodiment, the user terminal 1300 may provide a voice recognition service through an intelligent app (or a voice recognition app) stored therein. In this case, for example, the user terminal 1300 may recognize the user's utterance or voice input received through the microphone and provide a service corresponding to the recognized voice input to the user.

According to an embodiment, the user terminal 1300 may perform a designated operation alone or with the intelligent server and/or service server, based on the received voice input. For example, the user terminal 1300 may execute an app corresponding to the received voice input and perform a designated operation through the executed app.

According to an embodiment, when the user terminal 1300 provides a service together with the intelligent server 1400 and/or the service server, the user terminal may detect a user's utterance using the microphone 1320 and generate a signal (or voice data) corresponding to the detected user's utterance. The user terminal may transmit the voice data to the intelligent server 1400 by using the communication interface 1310.

According to an embodiment, the intelligent server 1400 may generate a plan for performing a task corresponding to the voice input or a result of performing an operation according to the plan, in response to the voice input received from the user terminal 1300. For example, the plan may include a plurality of operations for performing a task corresponding to the user's voice input and a plurality of concepts related to the plurality of operations. The concept may define a parameter to be inputted to the execution of the plurality of operations or result values to be outputted by the execution of the plurality of operations. The plan may include association information between the plurality of operations and the plurality of concepts.

The user terminal 1300 according to an embodiment may receive the response using the communication interface 1310. The user terminal 1300 may output a voice signal generated inside the user terminal 1300 to the outside by using the speaker 1330, or may output an image generated inside the user terminal 1300 to the outside by using the display 1340.

Figure 14:
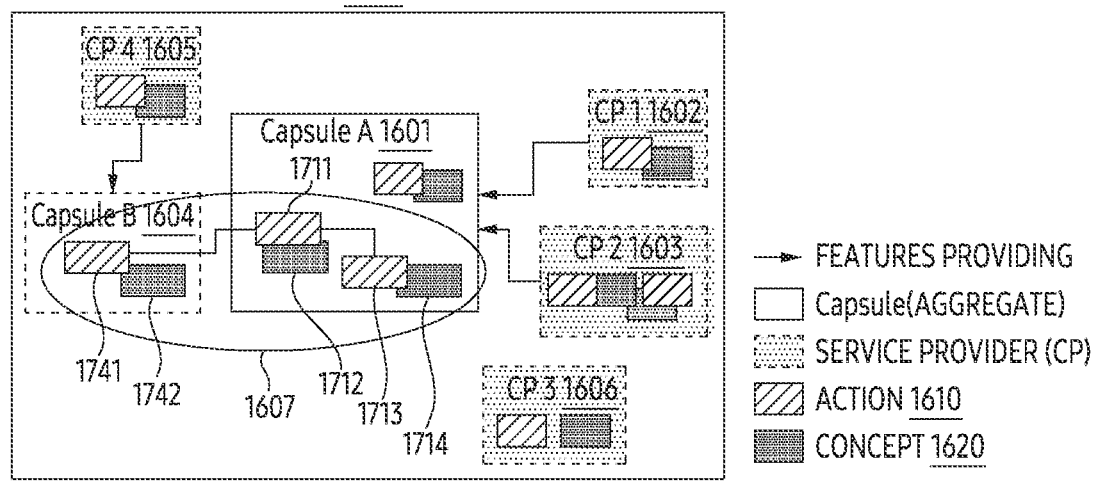
FIG. 14 is a diagram illustrating a schema for storing relationship information between a concept and an action in a database, according to an embodiment.

FIG. 14 is a diagram illustrating a schema for storing relationship information between a concept and an action in a database, according to an embodiment.

The capsule database (e.g., the capsule database 1430 of FIG. 13) of the intelligent server (e.g., the intelligent server 1400 of FIG. 13) may store a plurality of capsules in a form of a concept action network (CAN) 1600. The capsule database may store an operation for processing a task corresponding to a user's voice input and a parameter necessary for the operation in a form of a concept action network (CAN). The CAN may represent an organic relationship between an action and a concept defining a parameter required to perform the action.

The capsule database may store a plurality of capsules (e.g., Capsule A 1601, Capsule B 1604) corresponding to each of a plurality of domains (e.g., application). According to an embodiment, one capsule (e.g., Capsule A 1601) may correspond to one domain (e.g., application). In addition, one capsule may correspond to at least one service provider (e.g., CP 1 1602, CP 2 1603, CP 3 1606, or CP 4 1605) to perform a function of the domain related to the capsule. According to an embodiment, one capsule may include at least one operation 1610 and at least one concept 1620 for performing a designated function.

According to an embodiment, a natural language platform (e.g., the natural language platform 1420 of FIG. 13) may generate a plan for performing a task corresponding to the received voice input using a capsule stored in the capsule database. For example, a planner module (e.g., the planner module 1425 in FIG. 13) of the natural language platform may generate a plan by using a capsule stored in the capsule database. For example, a plan 1607 may be generated by using the operations 1711 and 1713 and concepts 1712 and 1714 of the Capsule A 1601, and operations 1741 and concepts 1742 of the Capsule B 1604.

Figure 15:
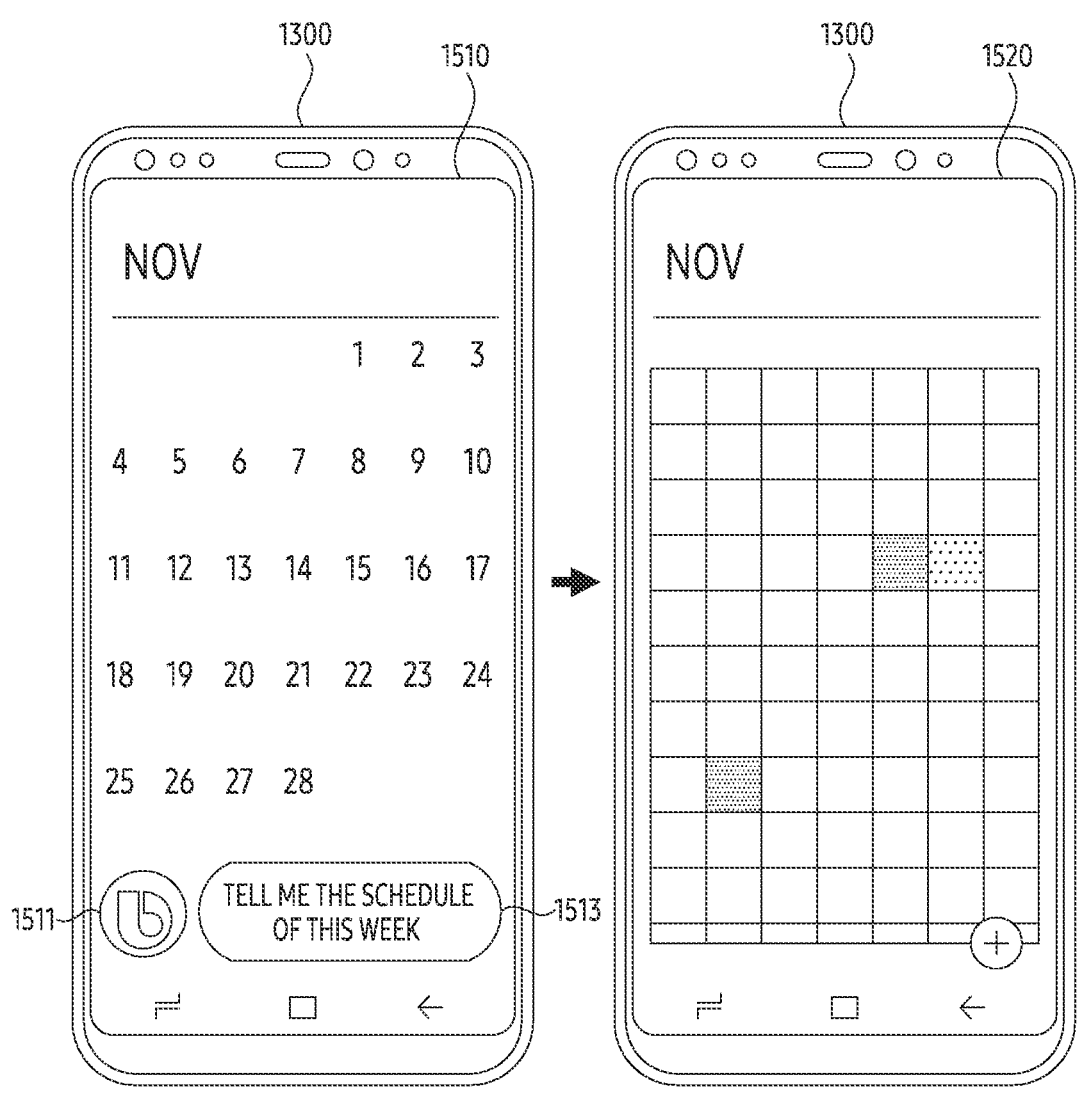
FIG. 15 is a diagram illustrating a user terminal that displays a screen for processing a voice input received through an intelligent app, according to an embodiment.

FIG. 15 is a diagram illustrating a user terminal that displays a screen for processing a voice input received through an intelligent app, according to an embodiment.

The user terminal 1300 may execute an intelligent app for processing a user input through an intelligent server (e.g., the intelligent server 1400 of FIG. 16).

According to an embodiment, in the screen 1513, the user terminal 1300 may execute an intelligent app for processing the voice input when recognizing a designated voice input (e.g., wake up!) or receiving an input through a hardware key (e.g., a dedicated hardware key). For example, the user terminal 1300 may execute an intelligent app in a state of executing a schedule app. According to an embodiment, the user terminal 1300 may display an object (e.g., icon) 1514 corresponding to an intelligent app on a display (e.g., the display 1340 of FIG. 13). According to an embodiment, the user terminal 1300 may receive a voice input by a user utterance. For example, the user terminal 1300 may receive a voice input saying, "Tell me the schedule of this week!". According to an embodiment, the user terminal 1300 may display a user interface (UI) 1513 (e.g., an input window) of an intelligent app in which text data of the received voice input is displayed on the display.

According to an embodiment, on screen 1520, the user terminal 1300 may display a result corresponding to the received voice input on the display. For example, the user terminal 1300 may receive a plan corresponding to the received user input and display 'schedule of this week' on the display according to the plan.

In an embodiment where an electronic device identifies a preset speech for executing a plurality of functions, such as a quick command, a method for more quickly executing the plurality of functions may be required. As described above, according to an embodiment, an electronic device (e.g., the electronic device 101 of FIG. 3) may comprise a communication circuitry (e.g., the communication circuit 330 of FIG. 3), a microphone (e.g., the microphone 320 of FIG. 3), a speaker (e.g., the speaker 310 of FIG. 3), and a processor (e.g., the processor 120 of FIG. 3). The processor may be configured to identify a first audio signal through the microphone. The processor may be configured to execute, based on identifying a speech (e.g., the speech 220 of FIG. 2) for sequentially executing a plurality of functions from the first audio signal, at least one first function among the plurality of functions. The processor may be configured to execute, based on identifying the speech, by using an external electronic device (e.g., the external electronic device 210 of FIG. 3) connected through the communication circuitry, at least one second function different from the at least one first function among the plurality of functions. The processor may be configured to output sequentially, through the speaker, second audio signals representing results of executing the at least one first function and the at least one second function according to a sequence associated with the speech. According to an embodiment, the electronic device may more quickly execute the plurality of functions by using an electronic device and an external electronic device based on a speech for executing the plurality of functions.

For example, the processor may be configured to obtain states of a first voice engine (e.g., the first voice engine 370 of FIG. 3) executed by the processor and a second voice engine (e.g., the second voice engine 380 in FIG. 3) executed by the external electronic device. The processor may be configured to divide, based on the states, the plurality of functions into the at least one first function to be executed by the first voice engine and at least one second function to be executed by the second voice engine.

For example, the processor may be configured to divide the each of the plurality of functions into the at least one first function and the at least one second function, based on whether each of the first voice engine or the second voice engine is able to execute a function that is indicated by the states.

For example, the processor may be configured to assign at least one first voice command corresponding to the at least one first function to a first queue (e.g., the first queue 710 of FIG. 7) corresponding to the first voice engine. The processor may be configured to assign at least one second voice command corresponding to the at least one second function to a second queue (e.g., the second queue 720 of FIG. 7) corresponding to the second voice engine.

The processor may be configured to execute the first voice engine based on the at least one first voice command accumulated in the first queue, among the voice commands.

The processor may be configured to transmit, to the external electronic device, at least one signal including the at least one second voice command accumulated in the second queue, among the voice commands.

For example, the electronic device may further comprise a memory (e.g., the memory 130 of FIG. 3). The processor may be configured to store information including the results aligned according to the sequence in the memory.

For example, the information may comprise a queue where speeches included in the second audio signals are aligned according to the sequence.

For example, the electronic device may further comprise a display (e.g., display 260 of FIG. 3). The processor may be configured to display distinct visual objects (e.g., the visual objects 882, 884, 886, 888 of FIG. 8) including the results in a parallel in the display.

As described above, according to an embodiment, a method of an electronic device may comprise identifying (e.g., operation 1210 of FIG. 12), based on receiving a first audio signal through a microphone of the electronic device, a speech included in the first audio signal. The method may comprise obtaining (e.g., operation 1220 of FIG. 12), based on identifying a plurality of voice commands from the speech, states of a first voice engine which is executed by the processor for processing a voice command, and a second voice engine executed by an external electronic device connected through a communication circuitry of the electronic device. The method may comprise obtaining (e.g., operation 1230 of FIG. 12), based on the states, information for dividing the plurality of voice commands into first voice command corresponding to the first voice engine, and second voice corresponding to the second voice engine. The method may comprise based on the information, executing (e.g., operation 1240 of FIG. 12) first function corresponding to the first voice command by using the first voice engine, and requesting (e.g., operation 1250 of FIG. 12) execution of second function corresponding to the second voice command to the external electronic device. The method may comprise outputting (e.g., operation 1260 of FIG. 12), through a speaker of the electronic device, a second audio signal representing results of execution of the first function and the second function based on a sequence of the plurality of voice commands indicated by the speech.

For example, the identifying the speech may comprise requesting, based on receiving the first audio signal, text data corresponding to the first audio signal to the external electronic device. The identifying the speech may comprise identifying the speech based on the text data received from the external electronic device.

For example, the obtaining the states may comprise identifying, in a memory of the electronic device, a preset speech for triggering execution of the plurality of voice commands based on the sequence. The obtaining the states may comprise identifying, based on whether the speech included in the first audio signal is corresponding to the preset speech, the plurality of voice commands matched to the speech.

For example, the requesting may comprise receiving, after requesting execution of the second function to the external electronic device, information including a result of execution of the second function from the external electronic device. The requesting may comprise storing, in the memory, the information received from the external electronic device based on the sequence.

For example, the obtaining the information may comprise obtaining, based on whether each of the first voice engine or the second voice engine is able to execute the plurality of voice commands based on the states, the information.

For example, the outputting may comprise displaying, in a display of the electronic device, visual objects respectively corresponding to results of execution of the first function and the second function.

As described above, according to an embodiment, a method of an electronic device may comprise identifying (e.g., operation 1010 of FIG. 10) a first audio signal through a microphone of the electronic device. The method may comprise executing (e.g., operation 1030 of FIG. 10), based on identifying a speech for sequentially executing a plurality of functions from the first audio signal, at least one first function among the plurality of functions. The method may comprise executing (e.g., operation 1040 of FIG. 10), based on identifying the speech, by using an external electronic device connected through a communication circuitry of the electronic device, at least one second function different from the at least one first function among the plurality of functions. The method may comprise sequentially outputting (e.g., operation 1050 of FIG. 10), through a speaker of the electronic device, second audio signals representing results of executing the at least one first function and the at least one second function according to a sequence associated with the speech.

For example, the method may comprise obtaining states of a first voice engine executed by the processor and a second voice engine executed by the external electronic device. The method may comprise dividing, based on the states, the plurality of functions into the at least one first function to be executed by the first voice engine and at least one second function to be executed by the second voice engine.

For example, the dividing may comprise dividing, based on whether each of the first voice engine or the second voice engine is able to execute a function that is indicated by the states, the each of the plurality of functions into the at least one first function and the at least one second function.

For example, the dividing may comprise assigning at least one first voice command corresponding to the at least one first function to a first queue corresponding to the first voice engine. The dividing may comprise assigning at least one second voice command corresponding to the at least one second function to a second queue corresponding to the second voice engine.

For example, the outputting may comprise outputting, based on queue of the speeches representing the results and aligned according to the sequence, the second audio signals.

As described above, according to an embodiment, an electronic device (e.g., the electronic device 101 of FIG. 3) may include a communication circuit (e.g., the communication circuit 330 of FIG. 3), a microphone (e.g., the microphone 320 of FIG. 3), a speakers (e.g., the speaker 310 of FIG. 3), and a processor (e.g., the processor 120 of FIG. 3). The processor may be configured to identify, based on receiving an audio signal through the microphone, a speech (e.g., the speech of FIG. 2) included in the first audio signal. The processor may be configured to obtain, based on identifying a plurality of voice commands (e.g., the voice commands 230 and 240 of FIG. 2) from the speech, states of a first voice engine (e.g., the first voice engine 370 of FIG. 3) which is executed by the processor for processing a voice command, and a second voice engine (e.g., the second voice engine 380 of FIG. 3) executed by an external electronic device (e.g., the external electronic device 210 of FIG. 3) connected through the communication circuitry. The processor may be configured to obtain, based on the states, information for dividing the plurality of voice commands into first voice command corresponding to the first voice engine, and second voice corresponding to the second voice engine. The processor may be configured to execute first function corresponding to the first voice command by using the first voice engine, and request execution of second function corresponding to the second voice command to the external electronic device, based on the information. The processor may be configured to output, through the speaker, a second audio signal representing results of execution of the first function and the second function based on a sequence of the plurality of voice commands indicated by the speech.

For example, the electronic device may further comprise a memory (e.g., the memory 130 of FIG. 3). The processor may be configured to identify, in the memory, a preset speech for triggering execution of the plurality of voice commands based on the sequence. The processor may be configured to identify, based on whether the speech included in the first audio signal is corresponding to the preset speech, the plurality of voice commands matched to the speech.

For example, the processor may be configured to receive, after requesting execution of the second function to the external electronic device, information including a result of execution of the second function from the external electronic device. The processor may be configured to store the information received from the external electronic device based on the sequence in the memory.

For example, the preset speech may comprise another word different from one or more words associated with the plurality of voice commands.

For example, the processor may be configured to obtain, based on whether each of the first voice engine or the second voice engine is able to execute the plurality of voice commands based on the states, the information.

For example, the processor may be configured to request, in response to receiving the first audio signal, text data corresponding to the first audio signal to the external electronic device. The processor may be configured to identify the speech based on the text data received from the external electronic device.

For example, the electronic device may further comprise a display. The processor may be configured to display, with the second audio signal outputted through the speaker, visual objects respectively corresponding to the results of the execution of the first function and the second function in the display.

For example, the processor may be configured to obtain, based on latency times of the first voice engine and the second voice engine corresponds to the states, the information by matching each of the plurality of voice commands to one of the first voice engine or the second voice engine.

For example, the processor may be configured to obtain, based on the states, the information indicating schedule for executing the plurality of voice commands by using at least one of the first voice engine or the second voice engine.

As described above, according to an embodiment, an electronic device may include a communication circuitry, a microphone, a speaker, a memory storing at least one instruction, and at least one processor. The at least one processor may be configured to execute the at least one instruction to identify a first audio signal received through the microphone. The at least one processor may be configured to, based on identifying that the first audio signal may include a speech for sequentially executing a plurality of functions, perform at least one first function from among the plurality of functions. The at least one processor may be configured to, based on identifying that the first audio signal may include the speech, perform at least one second function from among the plurality of functions on an external electronic device through the communication circuitry. The at least one second function may be different from the at least one first function. The at least one processor may be configured to sequentially output, through the speaker, at least one second audio signal representing at least one result of performing the at least one first function and the at least one second function based on a sequence associated with the speech.

For example, The at least one processor may be configured to execute the at least one instruction to obtain a state of a first voice engine that is executed on the electronic device, and a state of a second voice engine that is executed on the external electronic device. The at least one processor may be configured to, based on the state of the first voice engine and the state of the second voice engine, divide the plurality of functions into the at least one first function to be performed by the first voice engine and the at least one second function to be performed by the second voice engine.

For example, the state of the first voice engine may indicate whether the first voice engine is able to perform one of the plurality of functions, and the state of the second voice engine may indicate whether the second voice engine is able to perform one of the plurality of functions.

For example, the at least one processor may be configured to execute the at least one instruction to assign at least one first voice command corresponding to the at least one first function to a first queue corresponding to the first voice engine. The at least one processor may be configured to assign at least one second voice command corresponding to the at least one second function to a second queue corresponding to the second voice engine.

For example, the at least one processor may be configured to execute the at least one instruction to execute the first voice engine based on the at least one first voice command accumulated in the first queue.

For example, the at least one processor may be configured to execute the at least one instruction to transmit, to the external electronic device, at least one signal indicating that the at least one second voice command is accumulated in the second queue.

For example, the at least one processor may be configured to execute the at least one instruction to store information including the at least one result in the memory, based on the sequence.

For example, the information may include a queue where at least one speech in the at least one second audio signal is arranged based on the sequence.

For example, the electronic device may include a display. The at least one processor may be configured to execute the at least one instruction to control the display to display at least one distinct visual object showing the at least one result in a parallel.

As described above, according to an embodiment, a method of an electronic device, may include identifying, based on receiving a first audio signal through a microphone of the electronic device, a speech in the first audio signal. The method may include obtaining, based on identifying a plurality of voice commands from the speech, a state of a first voice engine that is executed on the electronic device, and a state of a second voice engine that is executed on an external electronic device, the external electronic device being connected through communication circuitry of the electronic device. The method may include obtaining, based on the state of the first voice engine and the state of the second voice engine, information for dividing the plurality of voice commands into at least one first voice command to be performed by the first voice engine, and at least one second voice command to be performed by the second voice engine. The method may include performing a first function corresponding to the at least one first voice command using the first voice engine, and requesting the external electronic device to perform a second function corresponding to the at least one second voice command. The method may include outputting, through a speaker of the electronic device, at least one second audio signal representing at least one result of performing the first function and the second function based on a sequence of the plurality of voice commands indicated by the speech.

For example, the identifying the speech in the first audio signal may include receiving, from the external electronic device, text data corresponding to the first audio signal. the identifying the speech in the first audio signal may include identifying the speech in the first audio signal based on the text data.

For example, the obtaining the state of the first voice engine and the state of the second voice engine may include identifying, in a memory of the electronic device, a preset speech for triggering performance of the plurality of voice commands based on the sequence. The obtaining the state of the first voice engine and the state of the second voice engine may include identifying the plurality of voice commands, based on whether the speech in the first audio signal corresponds to the preset speech.

For example, the requesting the external electronic device to perform the second function may include receiving, from the external electronic device, information including a result of performing the second function. The requesting the external electronic device to perform the second function may include storing the information in the memory of the electronic device based on the sequence.

For example, the state of the first voice engine may indicate whether the first voice engine is able to perform one of a plurality of functions, and the state of the second voice engine may indicate whether the second voice engine is able to perform one of the plurality of functions.

For example, the outputting the at least one second audio signal may include controlling a display of the electronic device to display at least one visual object showing a result of performing the first function and a result of performing the second function.

As described above, according to an embodiment, a method of an electronic device may include identifying a first audio signal received through a microphone of the electronic device. The method may include, based on identifying that the first audio signal may include a speech for sequentially executing a plurality of functions, performing at least one first function from the plurality of functions. The method may include, based on identifying that the first audio signal may include the speech, performing at least one second function from the plurality of functions, on an external electronic device connected through communication circuitry of the electronic device, the at least one second function being different from the at least one first function. The method may include sequentially outputting, through a speaker of the electronic device, at least one second audio signal representing at least one result of performing the at least one first function and the at least one second function based on a sequence associated with the speech.

For example, the method may include obtaining a state of a first voice engine that is executed on the electronic device, and a state of a second voice engine that is executed on the external electronic device. The method may include, based on the state of the first voice engine and the state of the second voice engine, dividing the plurality of functions into the at least one first function to be performed by the first voice engine and the at least one second function to be performed by the second voice engine.

For example, the state of the first voice engine may indicate whether the first voice engine is able to perform one of the plurality of functions, and the state of the second voice engine may indicate whether the second voice engine is able to perform one of the plurality of functions.

For example, the dividing may include assigning at least one first voice command corresponding to the at least one first function to a first queue corresponding to the first voice engine. The dividing may include assigning at least one second voice command corresponding to the at least one second function to a second queue corresponding to the second voice engine.

For example, the outputting may include outputting, based on queue of at least one speech in the at least one second audio signal, the at least one speech representing the at least one result according to the sequence.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMS, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims.

What is claimed is:

1. An electronic device comprising:
communication circuitry;
a microphone;
a speaker;
memory including one or more storage media storing instructions; and
at least one processor including processing circuitry, wherein the instructions, when executed by the at least one processor individually or collectively, cause the electronic device to:
identify a first audio signal received through the microphone;
identify a plurality of functions based on the first audio signal, wherein the plurality of functions comprises a first function and a second function,
identify a first attribute of the first function and a second attribute of the second function;
based on an identification that the first attribute indicates that the first function is executable by the electronic device, perform an execution of the first function by the electronic device and obtain a first result of the execution of the first function;
based on an identification that the second attribute indicates that the second function is not executable by the electronic device, request, to an external electronic device through the communication circuitry, an execution of the second function;
receive, from the external electronic device through the communication circuitry, a second result of the execution of the second function; and
output, through the speaker, at least one second audio signal representing at least one result of the first result or the second result.

2. The electronic device of claim 1, wherein the at least one processor is further configured to execute the instructions to:
obtain a state of a first voice engine that is executed on the electronic device, and a state of a second voice engine that is executed on the external electronic device; and
based on the state of the first voice engine and the state of the second voice engine, divide the plurality of functions into the first function to be performed by the first voice engine and the second function to be performed by the second voice engine.

3. The electronic device of claim 2, wherein the state of the first voice engine indicates whether the first voice engine is able to perform one of the plurality of functions, and the state of the second voice engine indicates whether the second voice engine is able to perform one of the plurality of functions.

4. The electronic device of claim 2, wherein the at least one processor is further configured to execute the instructions to:

assign at least one first voice command corresponding to the first function to a first queue corresponding to the first voice engine; and assign at least one second voice command corresponding to the second function to a second queue corresponding to the second voice engine.

5. The electronic device of claim 4, wherein the at least one processor is further configured to execute the instructions to execute the first voice engine based on the at least one first voice command accumulated in the first queue.

6. The electronic device of claim 4, wherein the at least one processor is further configured to execute the instructions to transmit, to the external electronic device, at least one signal indicating that the at least one second voice command is accumulated in the second queue.

7. The electronic device of claim 1, wherein the at least one processor is further configured to execute the instructions to store information comprising the at least one result in the memory.

8. The electronic device of claim 7, wherein the information comprises a queue where at least one speech in the at least one second audio signal is arranged based on a sequence.

9. The electronic device of claim 1, further comprising a display, wherein the at least one processor is further configured to execute the instructions to control the display to display at least one distinct visual object showing the at least one result in a parallel.

10. A method of an electronic device configured to communicate with an external electronic device, the method comprising:

identifying, based on receiving a first audio signal through a microphone of the electronic device, a speech in the first audio signal;

obtaining, based on identifying a plurality of voice commands from the speech, a state of a first voice engine that is executed on the electronic device, and a state of a second voice engine that is executed on the external electronic device;

obtaining, based on the state of the first voice engine and the state of the second voice engine, information for dividing the plurality of voice commands into at least one first voice command to be performed by the first voice engine, and at least one second voice command to be performed by the second voice engine;

performing a first function corresponding to the at least one first voice command using the first voice engine, and obtaining a first result of the first function performed by the electronic device, requesting the external electronic device to perform a second function corresponding to the at least one second voice command, and receiving, from the external electronic device, a second result of the second function performed by the external electronic device; and outputting, through a speaker of the electronic device, at least one second audio signal representing at least one result of the first result or the second result.

11. The method of claim 10, wherein the identifying the speech in the first audio signal comprises:

receiving, from the external electronic device, text data corresponding to the first audio signal; and identifying the speech in the first audio signal based on the text data.

12. The method of claim 10, wherein the obtaining the state of the first voice engine and the state of the second voice engine comprises:

identifying, in memory of the electronic device, a preset speech for triggering performance of the plurality of voice commands based on a sequence; and identifying the plurality of voice commands, based on whether the speech in the first audio signal corresponds to the preset speech.

13. The method of claim 10, wherein the state of the first voice engine indicates whether the first voice engine is able to perform one of a plurality of functions, and the state of the second voice engine indicates whether the second voice engine is able to perform one of the plurality of functions.

14. The method of claim 10, wherein the outputting the at least one second audio signal comprises controlling a display of the electronic device to display at least one visual object showing the first result of performing the first function or the second result of performing the second function.

15. A method of an electronic device, the method comprising:

identifying a first audio signal received through a microphone of the electronic device;

identify a plurality of functions based on the first audio signal, wherein the plurality of functions comprises a first function and a second function;

identify a first attribute of the first function and a second attribute of the second function;

based on an identification that the first attribute indicates that the first function is executable by the electronic device, performing an execution of the first function by the electronic device and obtaining a first result of the execution of the first function;

based on an identification that the second attribute indicates that the second function is not executable by the electronic device, request, to an external electronic device connected through communication circuitry of the electronic device, an execution of the second function;

receiving, from the external electronic device through the communication circuitry, a second result of the execution of the second function; and outputting, through a speaker of the electronic device, at least one second audio signal representing at least one result of the first result or the second result.

16. The method of claim 15, further comprising:

obtaining a state of a first voice engine that is executed on the electronic device, and a state of a second voice engine that is executed on the external electronic device; and based on the state of the first voice engine and the state of the second voice engine, dividing the plurality of functions into the first function to be performed by the first voice engine and the second function to be performed by the second voice engine.

17. The method of claim 16, wherein the state of the first voice engine indicates whether the first voice engine is able to perform one of the plurality of functions, and the state of the second voice engine indicates whether the second voice engine is able to perform one of the plurality of functions.

18. The method of claim 16, wherein the dividing comprises:

assigning at least one first voice command corresponding to the first function to a first queue corresponding to the first voice engine; and

assigning at least one second voice command correspond-
ing to the second function to a second queue corre-
sponding to the second voice engine.

19. The method of claim 15, wherein the outputting
comprises outputting, based on queue of at least one speech
in the at least one second audio signal, the at least one speech
representing the at least one result according to a sequence.

* * * * *